US009635979B2

(12) United States Patent
Abrams et al.

(10) Patent No.: US 9,635,979 B2
(45) Date of Patent: May 2, 2017

(54) OUTDOOR PIZZA OVEN

(71) Applicants: John Luther Abrams, Englewood, CO (US); Matthew Charles Goeden, Minneapolis, MN (US); Abran James Kean, Highlands Ranch, CO (US); Christopher David Hill, Douglas, WY (US)

(72) Inventors: John Luther Abrams, Englewood, CO (US); Matthew Charles Goeden, Minneapolis, MN (US); Abran James Kean, Highlands Ranch, CO (US); Christopher David Hill, Douglas, WY (US)

( * ) Notice: Subject to any disclaimer, the term of this patent is extended or adjusted under 35 U.S.C. 154(b) by 538 days.

(21) Appl. No.: 13/946,913

(22) Filed: Jul. 19, 2013

(65) Prior Publication Data
US 2014/0026881 A1 Jan. 30, 2014

Related U.S. Application Data

(60) Provisional application No. 61/675,313, filed on Jul. 24, 2012.

(51) Int. Cl.
*A47J 37/07* (2006.01)
*A47J 37/06* (2006.01)
(52) U.S. Cl.
CPC ....... *A47J 37/0713* (2013.01); *A47J 37/0658* (2013.01); *A47J 37/0718* (2013.01); *A47J 37/0763* (2013.01)

(58) Field of Classification Search
CPC .... A47J 37/07; A47J 37/0718; A47J 37/0763; A47J 37/0857
See application file for complete search history.

(56) References Cited

U.S. PATENT DOCUMENTS

| | | | | |
|---|---|---|---|---|
| 2,641,243 A * | 6/1953 | Goss | ............... | A47J 37/0763 126/25 R |
| 3,841,299 A * | 10/1974 | Tomita | ............... | A47J 37/0763 126/25 A |
| 3,915,144 A * | 10/1975 | Tomita | ............... | F24B 3/00 126/25 B |
| 4,210,072 A * | 7/1980 | Pedrini | ............... | A47J 37/0623 99/340 |
| 4,587,947 A * | 5/1986 | Tomita | ............... | A47J 37/0763 126/25 R |
| 4,603,679 A * | 8/1986 | Ogden | ............... | A47J 37/07 126/25 B |
| 5,365,833 A * | 11/1994 | Chen | ............... | F24B 1/003 126/273 R |
| 5,983,882 A * | 11/1999 | Ceravolo | ............... | A47J 37/0704 126/25 A |
| 6,054,697 A * | 4/2000 | Woodward | ............... | A21B 3/13 219/680 |

(Continued)

FOREIGN PATENT DOCUMENTS

DE 4030835 A1 * 4/1992 .......... A47J 36/2477
FR 2646336 A1 * 11/1990 .......... A47J 37/041

*Primary Examiner* — Christopher Harmon
(74) *Attorney, Agent, or Firm* — Matthew C. Goeden

(57) ABSTRACT

A pizza oven may include an upper portion, a lower portion, and cooking surface apparatus located between the upper portion and the lower portion. The pizza oven may be configured to provide a consistent and an even cooking environment in an enclosed region defined by the upper portion.

5 Claims, 23 Drawing Sheets

(56) References Cited

U.S. PATENT DOCUMENTS

| | | | | |
|---|---|---|---|---|
| 8,291,896 B1* | 10/2012 | Gonnella | ............ | A47J 37/0647 |
| | | | | 126/19 R |
| 2005/0039612 A1* | 2/2005 | Denny | ................ | A47J 37/0623 |
| | | | | 99/450 |
| 2009/0025574 A1* | 1/2009 | Byrnes | ................ | A47J 37/0704 |
| | | | | 99/447 |
| 2009/0199839 A1* | 8/2009 | Hulsey | .................... | A47J 37/07 |
| | | | | 126/25 A |
| 2010/0218754 A1* | 9/2010 | Kuntz | ................. | A47J 37/0786 |
| | | | | 126/25 R |
| 2011/0219958 A1* | 9/2011 | Noble | .................... | A23B 4/044 |
| | | | | 99/473 |
| 2014/0345594 A1* | 11/2014 | Rhodes | ............... | A47J 37/0704 |
| | | | | 126/25 R |

\* cited by examiner

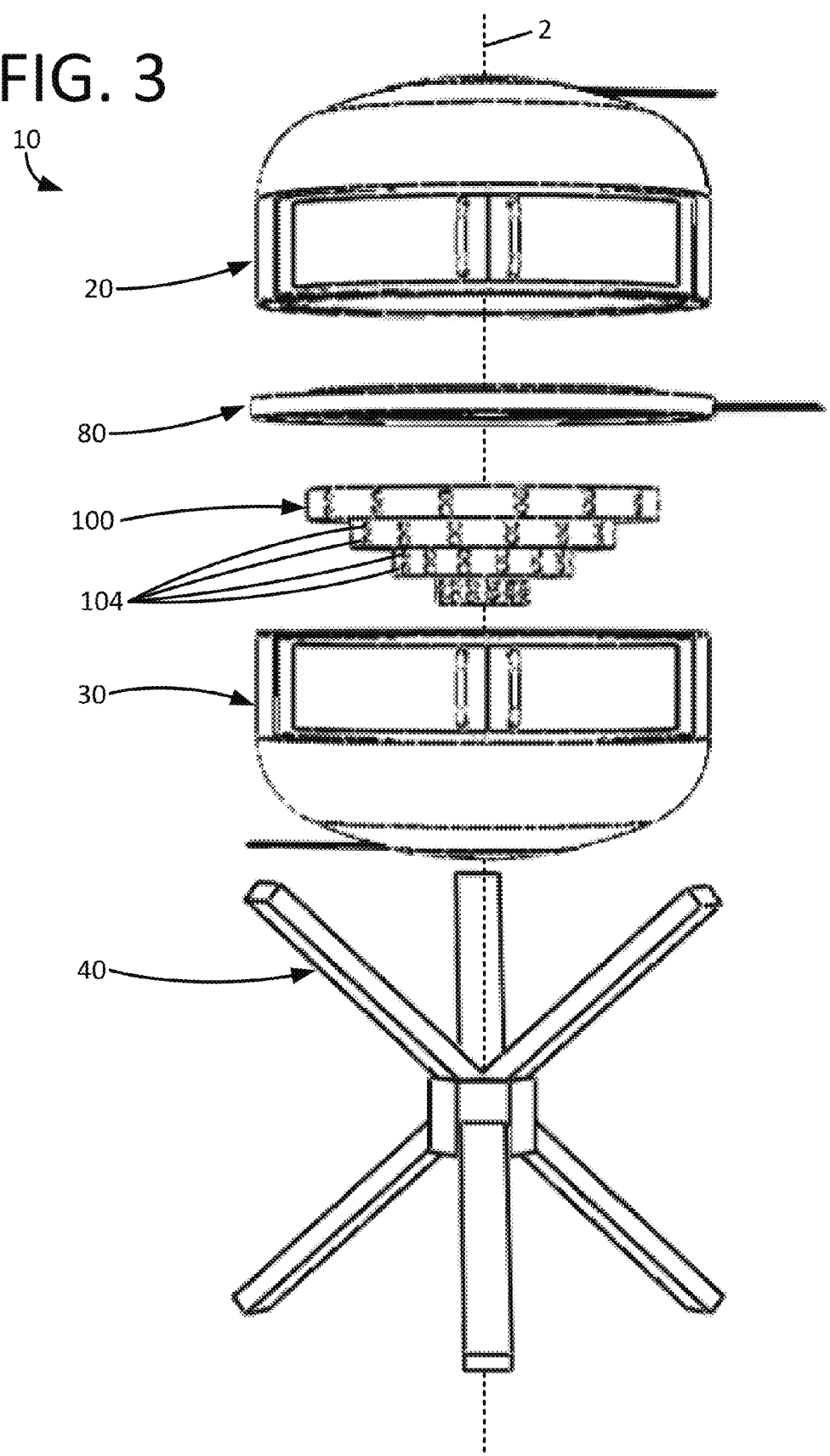

OUTDOOR PIZZA OVEN

CROSS-REFERENCE TO RELATED APPLICATIONS

This application claims the benefit of U.S. Provisional Application No. 61/675,313, entitled "PORTABLE OUTDOOR PIZZA OVEN," filed 24 Jul. 2012, wherein is incorporated herein by reference in its entirety.

BACKGROUND

The disclosure herein is related to outdoor oven apparatus, e.g., for use in baking pizzas or the like.

Conventional outdoor ovens that use solid fuel (e.g. wood, charcoal, pellets, charcoal briquettes, coal) are often large and cumbersome and/or fail to provide adequate, or proper, and consistent cooking temperatures (e.g., cooking temperatures greater than or equal to 650 degrees Fahrenheit). Further, ovens capable of adequate and consistent cooking temperatures may require extensive preparation. For example, it often takes many hours of preparation (e.g., tending a fire or coals, etc.) to bring the cooking temperatures of a classically-styled brick oven to adequate cooking temperatures, e.g., for Neapolitan pizza. Also, classically-styled brick ovens are often large, heavy, and built-in fixtures (e.g., in users' backyards). Further, for example, other ovens may require significant interaction (e.g., frequent tending to the fuel sources, frequent adjustment, etc.) to maintain adequate cooking temperatures.

SUMMARY

The disclosure herein describes exemplary ovens and oven apparatus that allow breakdown and portability, provide adequate and consistent cooking temperatures (e.g., greater than or equal to 700 degrees Fahrenheit, greater than or equal to 800 degrees Fahrenheit, greater than or equal to 900 degrees Fahrenheit, etc.), achieve such cooking temperature quickly, maintain such cooking temperature while inserting and removing multiple foods, require less interaction to maintain consistent, adequate cooking temperatures, exhibit a high quality of construction and materials for long life, and provide an ease to use, etc. One exemplary oven includes an upper portion and a lower portion configured to be used to together to define an enclosed region, e.g., for use in baking pizzas. Each of the upper portion and the lower portion may include one or more walls separated by an insulation region, e.g., configured to insulate the enclosed region from outside of the oven to maintain adequate cooking temperatures within the enclosed region and to allow adequate cooking temperatures to be achieved relatively quickly (e.g., when compared to a classically-styled brick oven).

In at least one embodiment, the oven may further include heat control apparatus (e.g., baffle apparatus) located between the upper portion and the lower portion configured to control airflow between the enclosed region defined by the lower portion and the enclosed region defined by the upper portion.

One exemplary oven may include an upper portion and a lower portion. The lower portion may be configured to interface with the upper portion to define an enclosed region and the lower portion may be further configured to receive a heat source to provide heat to the enclosed region. The oven may further include a heat control apparatus located between the upper portion and the lower portion configured to control airflow between the enclosed region defined by the upper portion and the enclosed region defined by the lower portion. The heat control apparatus may be configurable in at least an open position and a closed position. When in the open position, the heat control apparatus may be configured to provide airflow between the enclosed region defined by the lower portion and the enclosed region defined by the upper portion. When in the closed position, the heat control apparatus may be configured to restrict airflow between the enclosed region defined by the lower portion and the enclosed region defined by the upper portion.

In one or more embodiments, at least one of the upper portion and the lower portion may define a passage and further include door apparatus configurable in at least an open position and a closed position. When in the open position, the door apparatus may allow passage of material through the passage into the enclosed region from outside of the oven and, when in the closed position, the door apparatus may prevent passage of material through the passage into the enclosed region. Further, each of the upper portion and the lower portion may include door apparatus. Still further, the door apparatus may further include at least one slidable door portion configured to move between at least the open position and the closed position and at least one handle portion (e.g., including insulative material) coupled to the at least one slidable door portion configured to be grasped by a user to move the at least one slidable door portion between the open position and the closed position.

In one or more embodiments, at least one of the upper portion and the lower portion may define one or more vent openings extending from the enclosed region to outside of the oven, and the oven may further include at least one vent apparatus coupled to at least one of the upper portion and the lower portion proximate to the one or more vent openings. The at least one vent apparatus may be configurable between an open position and a closed position. When in the open position, the at least one vent apparatus may allow passage of air between the enclosed region and outside of the oven through the one or more vent openings and, when in the closed position, the at least one vent apparatus may restrict passage of air between the enclosed region and outside of the oven through the one or more vent openings.

In at least one embodiment, the heat control apparatus may include a central portion defining a plurality of openings (e.g., wedge-shaped openings) and configured to extend across the enclosed region and at least one movable portion locatable proximate the plurality of openings of the central portion. When the heat control apparatus is configured in the open position, the at least one movable portion may be located with respect to the central portion to provide airflow through the plurality of openings between the enclosed region defined by the lower portion and the enclosed region defined by the upper portion and, when the heat control apparatus is configured in the closed portion, the at least one movable portion may be located with respect to the central portion to restrict airflow through the plurality of openings between the enclosed region defined by the lower portion and the enclosed region defined by the upper portion. In at least one embodiment, the at least one movable portion further may include a handle portion extending outside of the enclosed region configured for a user to grasp to move the at least one movable portion to configure the heat control apparatus in at least the open position and the closed position. Further, in at least one embodiment, the central portion may define an outer ring region surrounding an inner circular region. The at least one movable portion may include an outer portion and an inner portion. The outer portion may be located proximate the outer ring region of the central portion, and the outer portion may be configurable to allow and to restrict airflow between the enclosed region defined by the lower portion and the enclosed region defined by the upper portion in the outer ring region. The inner portion may be located proximate the inner circular region of the central portion, and the inner portion may be configurable to allow and to restrict airflow between the enclosed region defined by the lower portion and the enclosed region defined by the upper portion in the inner circular region. In at least one embodiment, the oven may further include a baking stone located on the heat control apparatus in the enclosed region defined by the upper portion, and the baking stone may be configured for a pizza to be located thereon to provide an even heating surface. In at least one embodiment, at least one of the upper portion and the lower portion may define a hemispherical or hemi-ellipsoidal domed region of the enclosed region. In at least one embodiment, at least one of the upper portion and the lower portion may define a cylindrical region connected to a domed region of enclosed region. Still further, at least one sliding door may be configured to operate between the inner and outer wall of the cylindrical region. In other words, the at least one sliding door may slide between the inner and outer walls (e.g., like a pocket door).

In one or more embodiments, the lower portion further may include fire bowl apparatus defining an inverted stepped conical region configured to hold combustible material. The fire bowl apparatus may further define a plurality of apertures through the fire bowl apparatus configured to allow airflow from outside of the inverted conical region to inside the inverted conical region.

In at least one embodiment, the fire bowl apparatus may include a plurality radial extending arm members defining a step-shaped bowl configured to hold combustible material off of the bottom surface of the enclosed region.

In one or more embodiments, at least one of the upper portion and the lower portion may include an inner wall facing the enclosed region and an outer wall located outside of the inner wall. In at least one embodiment, at least one of the upper portion and the lower portion may further include insulative material (e.g., a metal-based insulator, a silica-based insulator, etc.) located between the inner wall and the outer wall.

One exemplary embodiment of an oven may include an upper portion and a lower portion configured to interface with the upper portion to define an enclosed region. The oven may further include a cooking surface (e.g., configured to be located in the upper portion). The lower portion may be further configured to receive a heat source to provide heat to the enclosed region. Each of the upper portion and the lower portion may define a passage and may further include a door apparatus.

In at least one embodiment, each of the upper portion and lower portion may include a cylindrical region and a domed (e.g., hemi-ellipsoidal) region such that, when the upper portion and lower portion are interfaced to define an enclosed region, the profile view (e.g., viewed from the side) of the interfaced upper portion and lower portion forms a geometrical stadium. Further, the door apparatus of each of the upper portion and the lower portion may be located on the cylindrical region of each of the upper portion and lower portion. Still further, the door apparatus of each of the upper portion and the lower portion may be configured to open horizontally.

In one or more embodiments, the oven may further include fire bowl apparatus located in the lower portion and defining an inverted conical region configured to hold combustible material. The fire bowl apparatus may further define a plurality of apertures through the fire bowl apparatus configured to allow airflow from outside of the inverted conical region to inside the inverted conical region. In at least one embodiment, the upper portion is removable from the lower portion to expose the fire bowl apparatus.

One exemplary oven may include an upper portion configured to include a cooking surface and a lower portion configured to interface with the upper portion to define an enclosed region. The lower portion may be further configured to receive a heat source to provide heat to the enclosed region. The oven may further include means for insulating each of the upper portion and the lower portion, means for accessing each of the upper portion and the lower portion, and/or means for controlling air flow between the upper portion and the lower portion.

In at least one embodiment, the oven further includes gas apparatus configured to heat the enclosed region of the lower portion. For example, the gas apparatus may include a propane heating element, e.g., to provide heat to combustible material within the enclosed region of the lower portion, to preheat the enclosed region, etc. Further, the gas apparatus may be configured to "superheat" the enclosed region. In other words, a propane heating element may be used to heat up combustible material quickly, and then the combustible material may be used fuel for taste (e.g., to expedite the time it takes to heat up the enclosed region).

One exemplary oven may include an upper portion and a lower portion configured to interface with the upper portion to define an enclosed volume. The lower portion may be further configured to receive a heat source to provide heat to the enclosed volume. The exemplary oven may further include a cooking surface apparatus suspended within the enclosed volume and defining a cooking surface facing the enclosed volume defined by the upper portion and configured to receive cookable material thereon. The exemplary oven may further include heat control apparatus located between the upper portion and the lower portion configured to control airflow between the enclosed volume defined by the upper portion and the enclosed volume defined by the lower portion. The heat control apparatus may be configured to restrict radiant energy directly transmitted from a heat source to the cooking surface apparatus.

One exemplary oven may include an upper portion and a lower portion configured to interface with the upper portion to define an enclosed volume. The lower portion may be further configured to receive a heat source to provide heat to the enclosed volume. The exemplary oven may further include cooking surface apparatus and fire bowl apparatus. The cooking surface apparatus may be suspended within the enclosed volume and defining a cooking surface facing the enclosed volume of the upper portion configured to receive cookable material thereon. The fire bowl apparatus (e.g., the fire bowl apparatus may define an inverted stepped conical region configured to hold combustible material) may be located in the enclosed volume defined by the lower portion and configured to hold combustible material away from an inner wall of the lower portion to allow airflow around and through the fire bowl apparatus.

One exemplary oven may include an upper portion and a lower portion configured to interface with the upper portion to define an enclosed volume. The lower portion may be further configured to receive a heat source to provide heat to the enclosed volume. Further, each of the upper and the lower portions may be configured to provide laminar fluid flow of heated fluid (e.g. air and combustion products from the combustible material) along the inside of the inner walls of the enclosed volume defined by the lower portion and upper portion of the enclosed volume and proximate to the interface between the lower portion and upper portion of the enclosed volume (e.g., to provide an increase rate of heat transfer from the lower portion to the upper portion of the enclosed volume). The exemplary oven may further include a cooking surface apparatus suspended within the enclosed volume and defining a cooking surface facing the enclosed volume defined by the upper portion and configured to receive cookable material thereon.

In one or more embodiments, the heat control apparatus may be adjustable to control airflow between the enclosed volume defined by the lower portion and the enclosed volume defined by the upper portion.

In one or more embodiments, the heat control apparatus may include a concave wall extending into the enclosed volume defined by the lower portion to direct airflow from the enclosed volume defined by the lower portion to around the heat control apparatus to the enclosed volume defined by the upper portion. The concave walls and surfaces may further reduce heated fluid drag losses of heated fluid (e.g. air and combustion products from the combustible material) and increase the flow rate of heated fluid from the lower portion to the upper portion of the enclosed volume, increasing the rate of heat transfer from the lower portion to the upper portion of the enclosed volume.

In one or more embodiments, the cooking surface apparatus may define a circular region and a ring region located outside of the circular region. The ring region may define a plurality of apertures to allow airflow in the enclosed volume between the lower portion and the upper portion.

In one or more embodiments, the cooking surface apparatus may include a baking stone defining the cooking surface. Further the baking stone may be configured to provide the cooking surface of the cooking surface apparatus.

In one or more embodiments, at least one of the upper portion and the lower portion may include an inner wall facing the enclosed volume and an outer wall located outside of the inner wall. Further, at least one of the upper portion and the lower portion further may include insulative material located between the inner wall and the outer wall.

In one or more embodiments, the fire bowl apparatus may further include a plurality of radially-extending arm members that define a plurality apertures configured to allow airflow therethrough.

In one or more embodiments, the lower portion may define one or more vent openings extending from the enclosed volume to outside of the oven. The oven may further include lower vent apparatus coupled to the lower portion proximate to the one or more vent openings and configured to selectively provide passage of air between the enclosed volume and outside of the oven through the one or more vent openings. Further, the one or more vent openings may be configured to allow air to flow underneath combustible material located in the fire bowl apparatus from outside of the oven and to allow combusted material to pass from the fire bowl apparatus to outside of the oven.

In one or more embodiments, the upper portion may define an upper portion inner surface and the lower portion defines a lower portion inner surface. Further, the lower portion may be configured to interface with the upper portion such that the upper portion inner surface and the lower portion inner surface defines the enclosed volume. Still further, each of the upper portion inner surface and the lower portion inner surface may provide a continuous, corner-less surface to provide laminar and consistent fluid flow of heated fluid from the enclosed volume defined by the lower portion inner surface to the enclosed volume defined by the upper portion inner surface.

In one or more embodiments, each of the upper portion and the lower portion may define one or more vent openings extending from the enclosed volume to outside of the oven. Further, each of the upper portion and lower portion may include a cylindrical region and a hemi-ellipsoidal region such that, when the upper portion and lower portion are interfaced to define the enclosed volume, the enclosed volume defines a geometrical stadium to provide a flue effect in the enclosed volume from the one or more venting openings of the lower portion to the one or more vent openings of the upper portion.

In one or more embodiments, each of the upper portion and the lower portion may define one or more vent openings extending from the enclosed volume to outside of the oven and the oven may be configured to provide a flue effect in the enclosed volume from the one or more venting openings of the lower portion to the one or more vent openings of the upper portion without using a chimney extending from the upper portion.

In one or more embodiments, at least a portion of the enclosed volume is cylindrical.

In one or more of embodiments, a multi-leg stand separates the enclosed volume from floor or ground level. Further, this multi-leg stand may be of configuration to place a cooking surface at a height above floor or ground level to aid in convenient access to cookable material with cooking tools (e.g., a pizza peel). Further, this multi-leg stand may be configured to be easily separated from one or more other components of the exemplary oven when the oven is not in operations.

In one or more of embodiments, components of the exemplary oven are designed to be easily separated (e.g. without tools) from one another when not in operation. Each component when separated from other components may be moved from one location to another location independently and easily reassembled (e.g. without tools).

The above summary is not intended to describe each embodiment or every implementation disclosed herein. Advantages, together with a more complete understanding, will become apparent and appreciated by referring to the following detailed description and claims taken in conjunction with the accompanying drawings.

BRIEF DESCRIPTION OF THE DRAWINGS

FIG. 3 is an exploded, front view of the oven of FIG. 1.

DETAILED DESCRIPTION

Figure 1A:
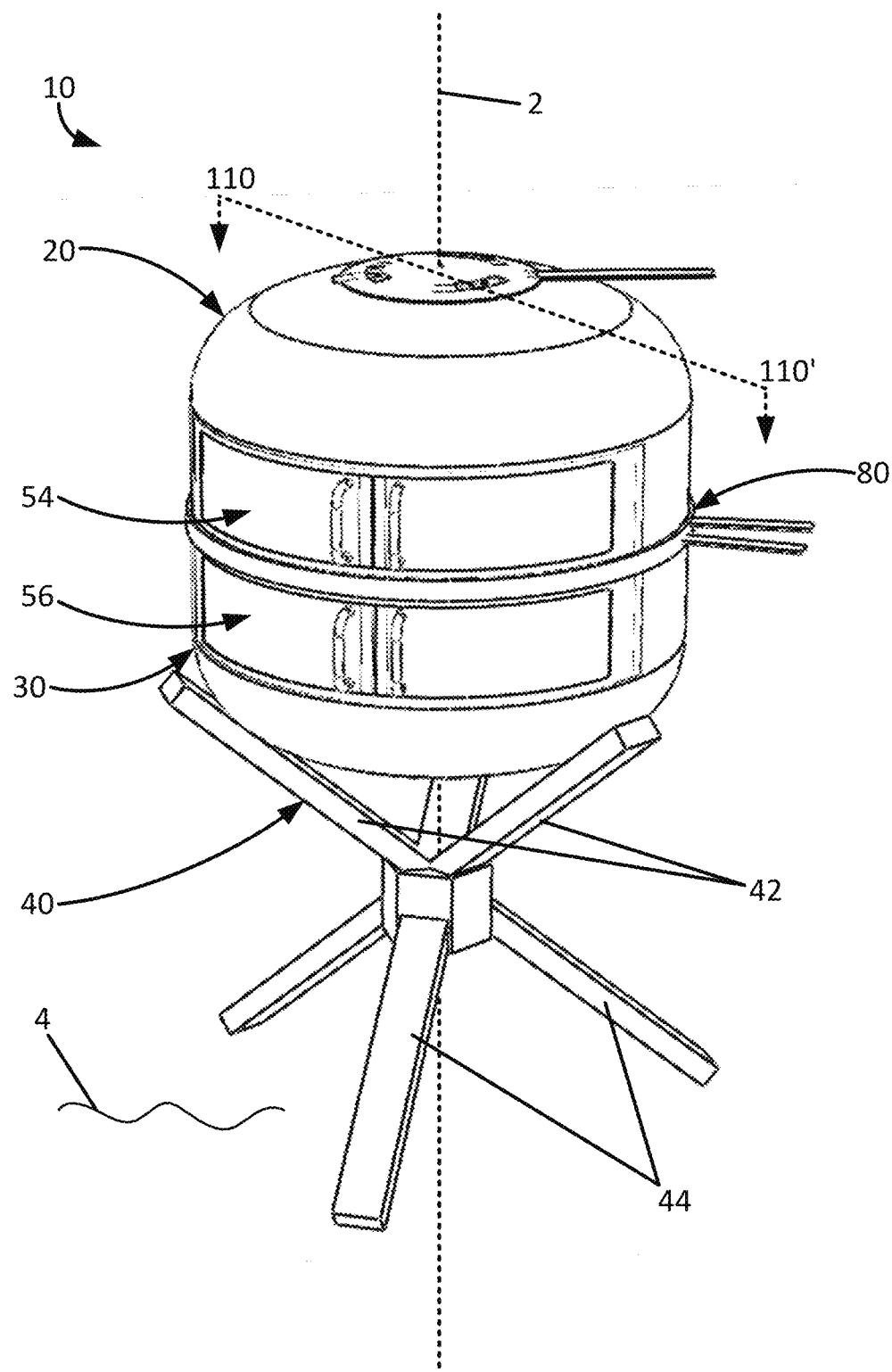
FIGS. 1A-1B are perspective and front views, respectively, of an exemplary pizza oven.

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus and devices shall be described with reference to FIGS. 1-21. It will be apparent to one skilled in the art that elements or processes from one embodiment may be used in combination with elements or processes of the other embodiments, and that the possible embodiments of such apparatus and devices using combinations of features set forth herein is not limited to the specific embodiments shown in the figures and/or described herein. Further, it will be recognized that timing of the size and shape of various elements herein may be modified but still fall within the scope of the present disclosure, although certain one or more shapes and/or sizes, or types of elements, may be advantageous over others.

An exemplary oven 10, e.g., for cooking pizza, is depicted in FIGS. 1-14. Generally, the exemplary oven 10 may be configured to provide a portable, high-quality, and high-efficiency oven for use in "backyard"-type environments. Further, the exemplary oven 10 may be configured to be capable of providing cooking temperatures within the oven 10 greater than or equal to 700 degrees Fahrenheit, greater than or equal to 800 degrees Fahrenheit, greater than or equal to 900 degrees Fahrenheit, etc. and baking surface temperatures greater than or equal to 700 degrees Fahrenheit on a baking surface within the oven 10 to, for example, provide a proper cooking environment for classic Neapolitan-style pizza. Still further, the oven 10 may be configured so as to be able to provide such cooking temperatures quickly and efficiently.

As shown, the exemplary oven 10 includes an upper portion 20 and a lower portion 30 arranged along axis 2 (e.g., extending along axis 2). The lower portion 30, and in turn, the upper portion 20 that is located on top of the lower portion 30, may be supported on top of a ground surface 4 by base apparatus 40. The upper portion 20, the lower portion 30, and/or the base apparatus 40 may be separable from one another to provide portability. In other words, the oven 10 may break down, or be disassembled, for transportation and be put back together, or reassembled, after being transported (e.g., for tail gating, etc.). Additionally, the oven 10 may be configured such that the portions may cool more rapidly when separated from one another as well as fit into small spaces for transportation and/or storage.

The base apparatus 40 may include a plurality of support portions 42 configured to support the lower portion 30 and a plurality of leg portions 44 coupled to the support portions 42. The leg portions 44 are configured to contact the ground surface 4. Although the exemplary base apparatus 40 is shown and described, it is to be contemplated that any such base apparatus may be used to support the lower portion 30 from a ground surface 4 and that base apparatus 40 shown and described herein is merely one example.

Exemplary base apparatus 40 may include one or more materials such as metals (e.g. stainless steel, steel, cast iron, iron, brushed aluminum, aluminum, copper, etc.), polymers, ceramics, wood, etc. In at least one embodiment, the base apparatus 40 includes painted steel. The base apparatus 40 may be separable or collapsible, e.g., for ease of transportation, etc. Further, the base apparatus 40 may be removably coupled (e.g., detachable, etc.) or fixedly coupled to the lower portion 30. Still further the base apparatus 40 may be at least partially insulated from the lower portion 30.

Figure 4:
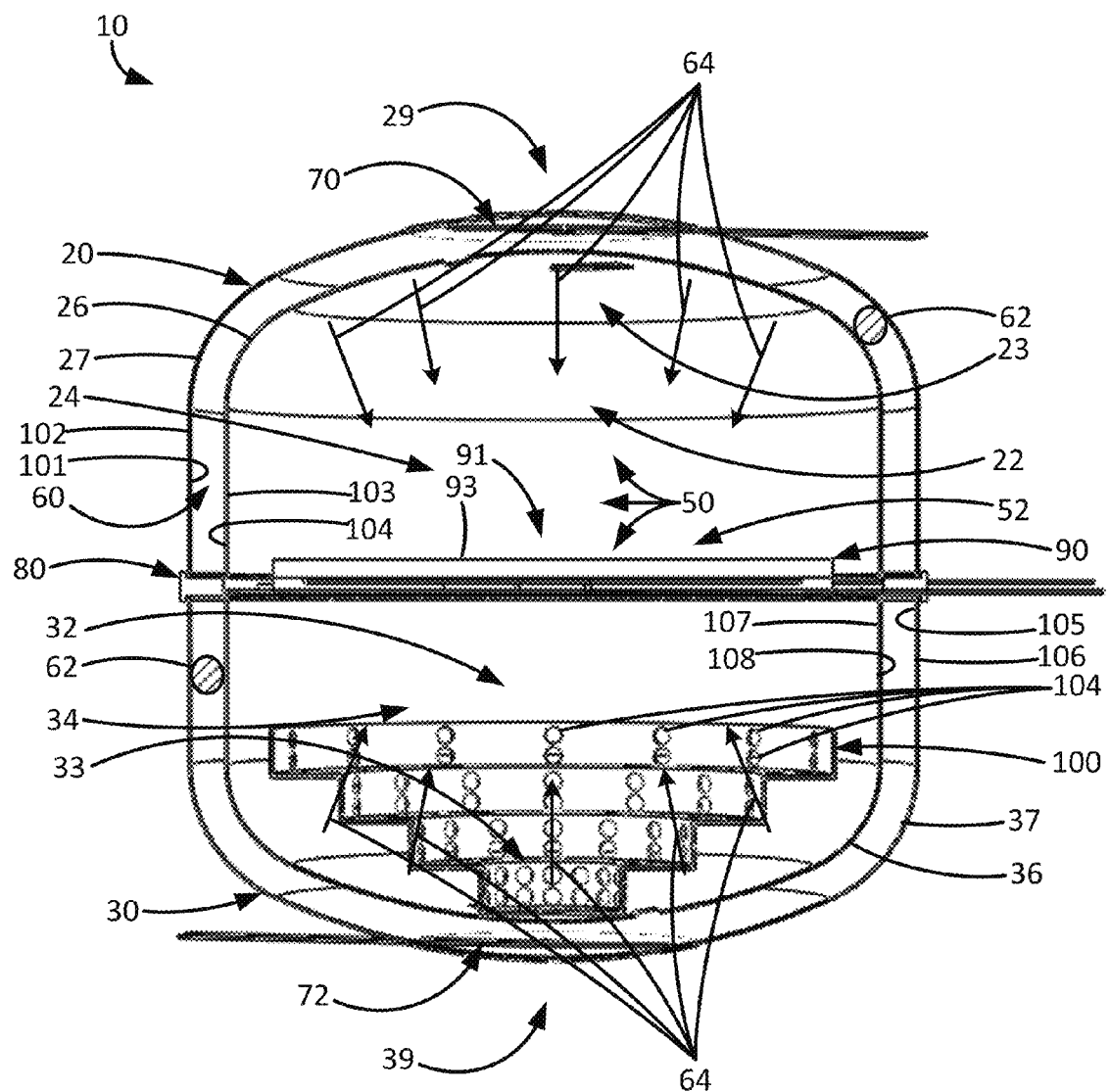
FIG. 4 is a cross-sectional view of the pizza oven of FIG. 1 taken across line 110-110'.
Figure 5:
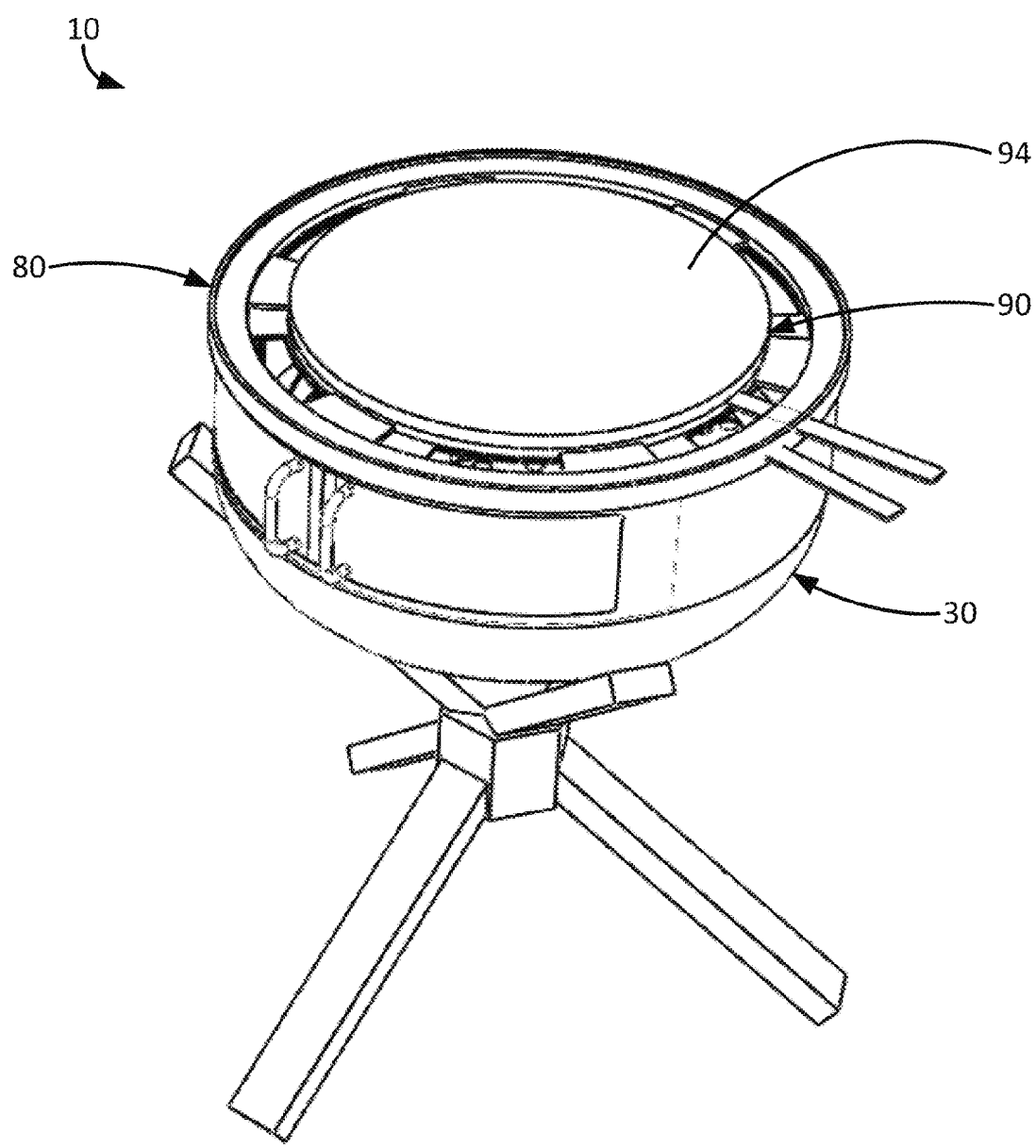
FIG. 5 is a perspective view of the lower portion, the heat control apparatus, and baking stone of the oven of FIG. 1 without the upper portion.
Figure 6:
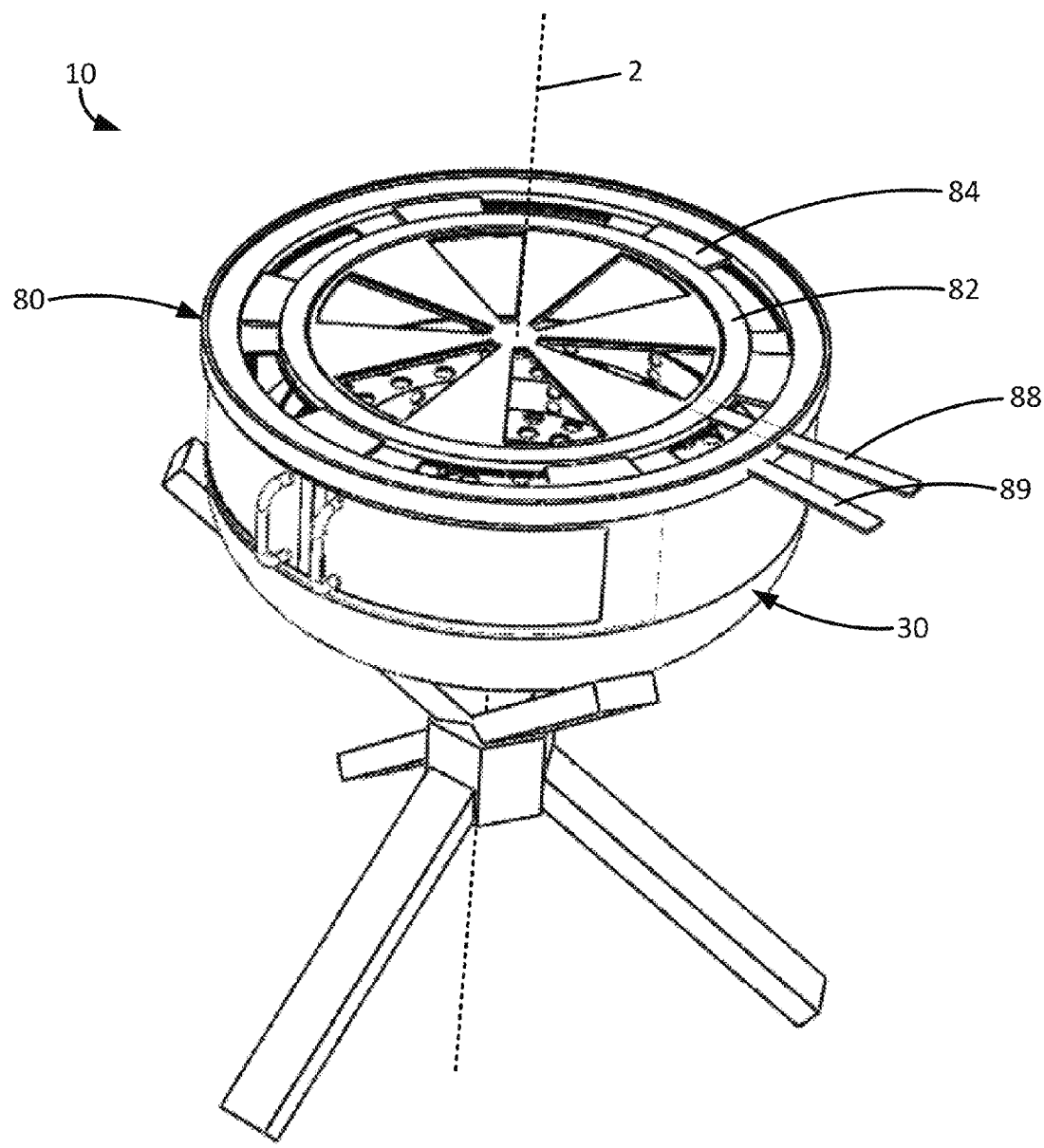
FIG. 6 is a perspective view of the lower portion and the heat control apparatus of FIG. 5 without the baking stone.

The upper portion 20 and the lower portion 30 may be interfaced with each other as shown in FIGS. 1-4 to define an enclosed volume, or region, 50 as shown in the cross-section of FIG. 4. The enclosed volume, or region, 50 defined by the upper portion 20 may be referred to as the upper enclosed region 22 and the enclosed volume, or region, 50 defined by the lower portion 30 may be referred to as the lower enclosed region 32. Generally, the upper enclosed region 22 may be configured for receiving consumable material to be baked, or cooked, and for providing a baking, or cooking, chamber, and the lower enclosed region 32 may be configured for receiving a heat source such as, e.g., flammable or combustible materials (e.g., wood, charcoal, pellets, charcoal briquettes, coal, etc.), gas burner apparatus, etc., to provide heat to, or within, the enclosed volume, or region, 50.

In at least this embodiment, the enclosed volume, or region, 50 is a geometric stadium enclosed space or area (e.g., pill-shaped) between the upper and lower portions 20, 30. Further, the enclosed volume 50 may be described as a geometrical stadium. More specifically, each of the upper enclosed region 22 and the lower enclosed region 32 may be described as defining a hemi-ellipsoidal region 23, 33, respectively, that extends into a cylindrical region 24, 34, respectively. The hemi-ellipsoidal regions 23, 33 may assist in directing heat energy towards the central area 52 of the enclosed region with radiative heat transfer, e.g., as depicted by arrows 64. Although the regions 23, 33 are described as being hemi-ellipsoidal, such regions 23, 33 may be of any other shape such as, e.g., hemispherical, domed, ellipsoidal, biconic, olgaive, cylindrical moving into to radii, etc.

The shape of the enclosed volume 50 as defined by the upper portion 20 and the lower portion 30 may provide adequate and proper airflow from a heat source location in the lower portion 30 to the upper portion 20. For example, the specific shape of the enclosed volume 50 may be configured, or designed, to provide a flue effect in the enclosed volume 50 from venting openings 39 defined through the lower portion 30 (described further herein) to the vent openings 29 defined through the upper portion 20 (described further herein). The flue effect may provide consistent airflow to rapidly heat the upper enclosed region 22 from the heat source located in the lower enclosed region 32.

Additionally, the shape of the enclosed volume 50 provides air/heat flow 360 degrees around the cooking surface apparatus, which, e.g., may provide even cooking across the cooking surface apparatus 91 (e.g., which may eliminate need for rotating or moving cookable material located on the cooking surface apparatus). For example, the cylindrical shape may provide heat/air flow to the cooking surface apparatus 91 from all directions perpendicular to the axis 2. In other words, the shape of the enclosed volume 50 directs heat/air flow all the way around the cooking surface apparatus 91. In general, the design characteristics of the enclosed volume 50 provide consistent air/heat flow about the upper enclosed region 22, which provide consistent and even cooking environments.

The length of the enclosed volume 50 taken along the axis 2 may additionally facilitate the flue effect such that the flue effect does not require, or need, the assistance of a chimney or stack. In other words, the length of the enclosed volume 50 may be selected to provide a flue effect without the use of a chimney or stack. For example, the length of the enclosed volume 50 taken along the axis 2 (e.g., from the vent openings 29 to the vent openings 39) may be compared relative to the maximum width or diameter of the enclosed volume 50 taken perpendicular to the axis 2 (e.g., located proximate the cooking surface apparatus 91). The length to diameter/width ration may be greater than or equal to about 0.9, greater than or equal to about 1.0, greater than or equal to about 1.1, greater than or equal to about 1.125, greater than or equal to about 1.2, greater than or equal to about 1.3, greater than or equal to about 1.4, etc. and/or less than or equal to about 1.7, less than or equal to about 1.6, less than or equal to about 1.5, less than or equal to about 1.4, less than or equal to about 1.3, less than or equal to about 1.2, etc.

Additionally, the shape of the enclosed volume 50 (e.g., as defined at least in part by the inner walls 26, 36 described further herein) may be described as providing a laminar airflow between the lower enclosed region 32 and the upper enclosed region 22. For example, the airflow proximate the inner wall surfaces of the cylindrical regions 24, 34 of the upper and lower portions 20, 30 may be described as being laminar, which, e.g., may provide effective fluid flow from the lower enclosed region 32 to the upper enclosed region 22 to provide consistent, adequate, rapid heat transfer from region 32 to region 22. Further, for example, the surfaces defining the enclosed volume 50 may be described as being continuous (e.g., lacking abrupt changes in the surface, being smooth, not jagged, etc.) and/or corner-less (e.g., containing volumes that are cylinders, ellipsoids, hemispheres, etc., lacking corners, lacking polygon features) so as to provide less turbulent airflow therethrough.

Each of the upper portion 20 and the lower portion 30 may include one or more walls. As shown, each portion 20, 30 is double-wall constructed. In other words, each portion 20, 30 includes an inner wall 26, 36 at least partially enclosing the enclosed volume, or region, 50 and an outer wall 27, 37 located outside of the inner wall 26, 36. The inner wall 26, 36 may face the enclosed volume, or region, 50. The outer wall 27, 37 may be located away from the inner wall 26, 36 by space 60. In other words, the outer wall 27, 37 may be spaced apart from the inner wall 26, 36. The space 60 between the inner wall 26, 36 and the outer wall 27, 37 may provide an insulative barrier between the inner wall 26, 36 and the outer wall 27, 37 to insulate the enclosed volume, or region, 50 from outside of the oven 10 and vice versa.

Each of the outer and inner walls 26, 27, 36, 37 may define inner and outer surfaces. As shown in FIG. 4, the outer wall 27 may define an inner surface 111 facing space 60 and an outer surface 112 facing the outside of the oven 10, the outer wall 26 may define an inner surface 113 facing the upper enclosed region 22 and an outer surface 114 facing the space 60, the outer wall 37 may define an inner surface 115 facing space 60 and an outer surface 116 facing the outside of the oven 10 and the outer wall 36 may define an inner surface 117 facing the lower enclosed region 32 and an outer surface 118 facing the space 60.

The inner surfaces 113, 117 of the inner walls 26, 36 (and/or the outer surfaces 114, 118 of the inner walls 26, 36 and the inner and outer surfaces 111, 112, 115, 116 of the outer walls 27, 37) may be coated with a high heat capacity, high emissivity material (e.g., ceramics, paints, electrostatic deposited metals, etc.) to increase radiative heat transfer to the consumable. Further, the outer surfaces 112, 116 of the outer walls 27, 37 (and/or the inner and outer surfaces 113, 114, 117, 118 of the inner walls 26, 36 and the inner surfaces 111, 115 of the outer walls 27, 37) may be coated with a material to extend product life, improve aesthetics, or resist corrosion (e.g., clear coat, paint, ceramics, metals, etc.).

One or more insulative materials 62 may be located in the space 60. The one or more insulative materials 62 may include metal-based insulative materials (e.g., fibrous metals, highly-reflective films, sintered porous media, etc.), silica-based insulative materials, (e.g., fibrous glasses, woven-fabrics, porous media, etc.), polymers, ceramics, clay composites (e.g., asbestos), minerals (e.g., clay), etc. Although the insulative materials 62 are only depicted in a couple locations in FIG. 4, it is to be understood that the entire, or substantially the entire, space 60 may contain insulative materials 62.

In at least one embodiment, no specific material may be located in the space 60. Instead, "air" or lack thereof (in other words a vacuum) may be located in the space 60.

Figure 1B:
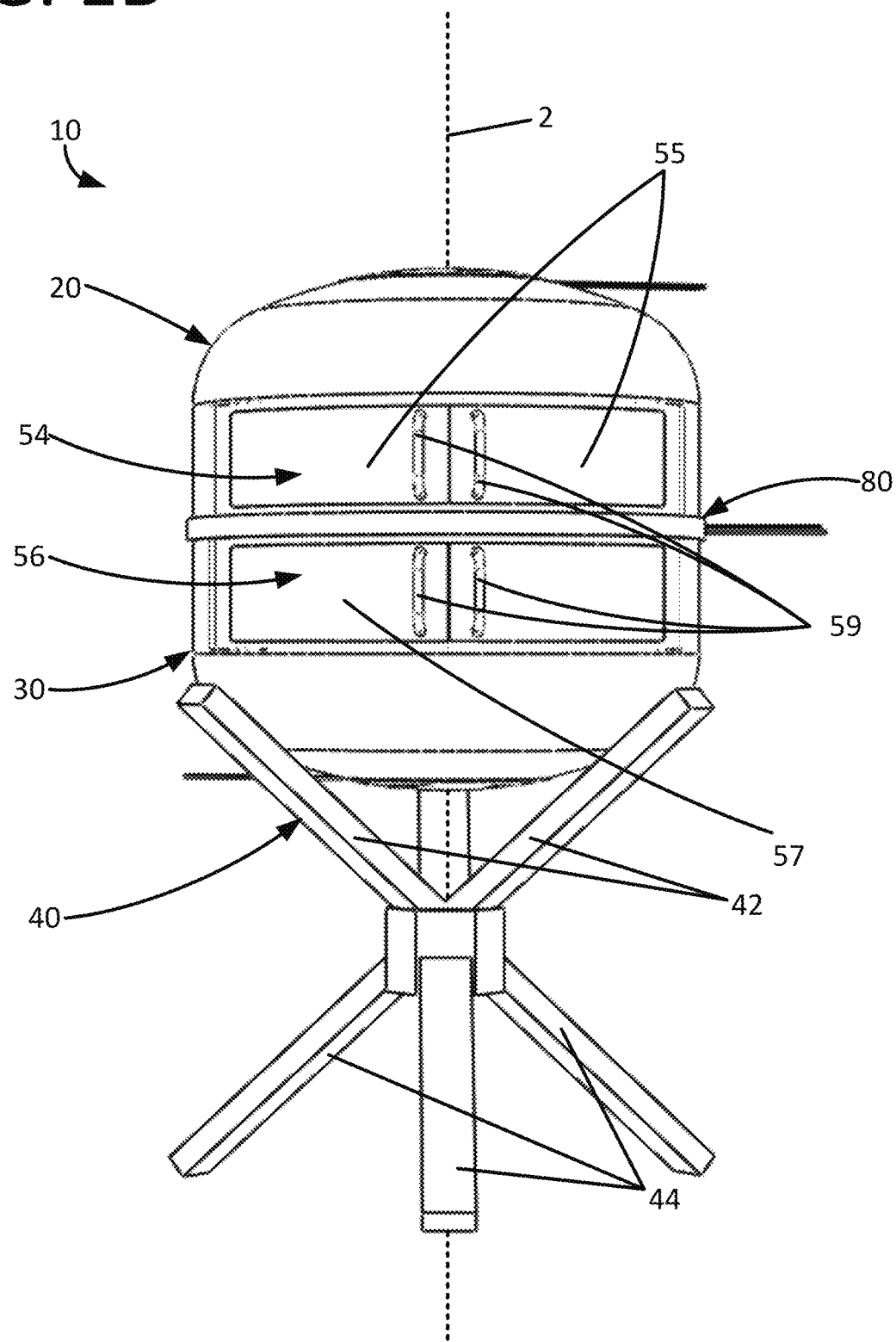
Figure 2A:
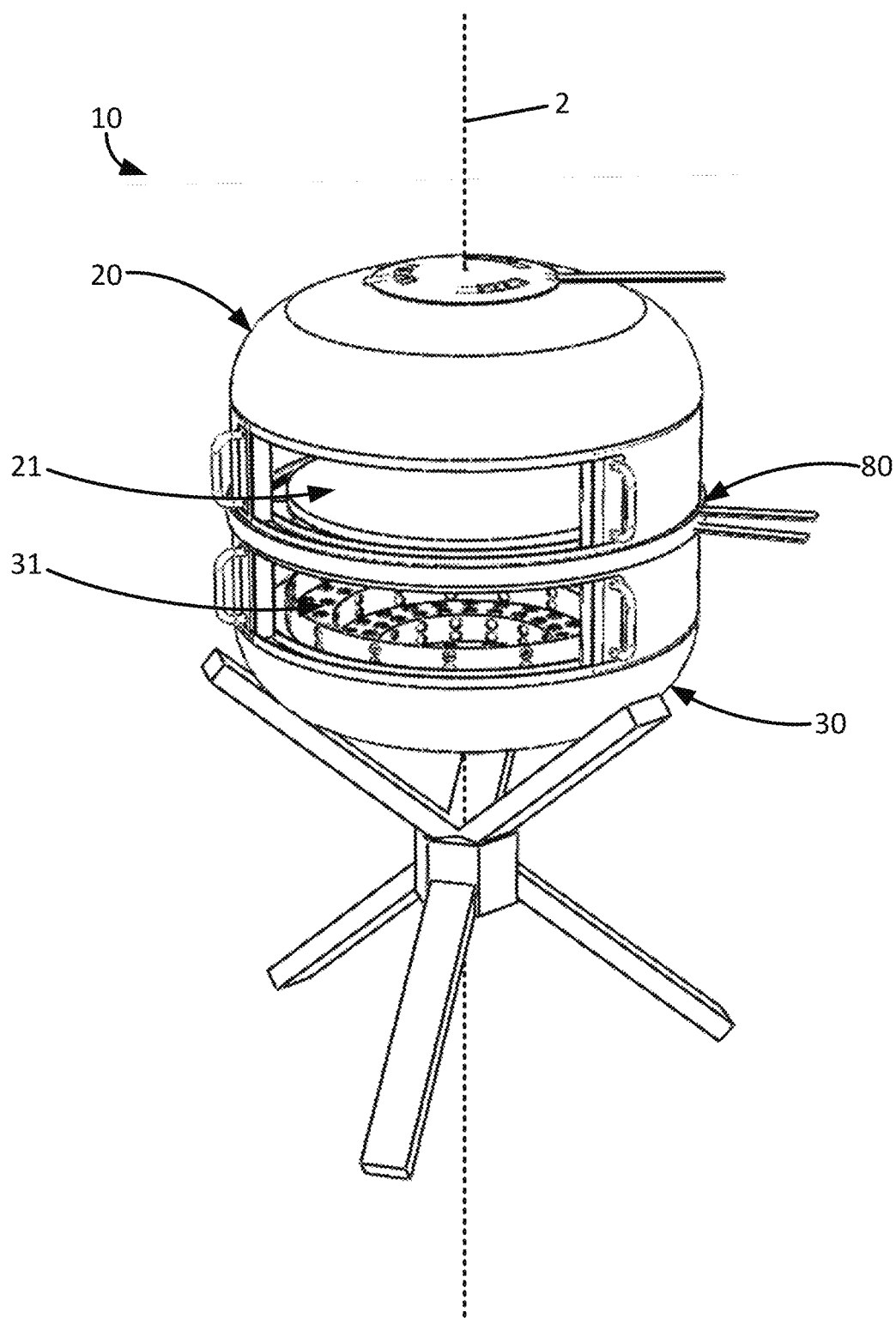
FIGS. 2A-2B are perspective and front views, respectively, of the oven of FIG. 1 with the doors opened.
Figure 2B:
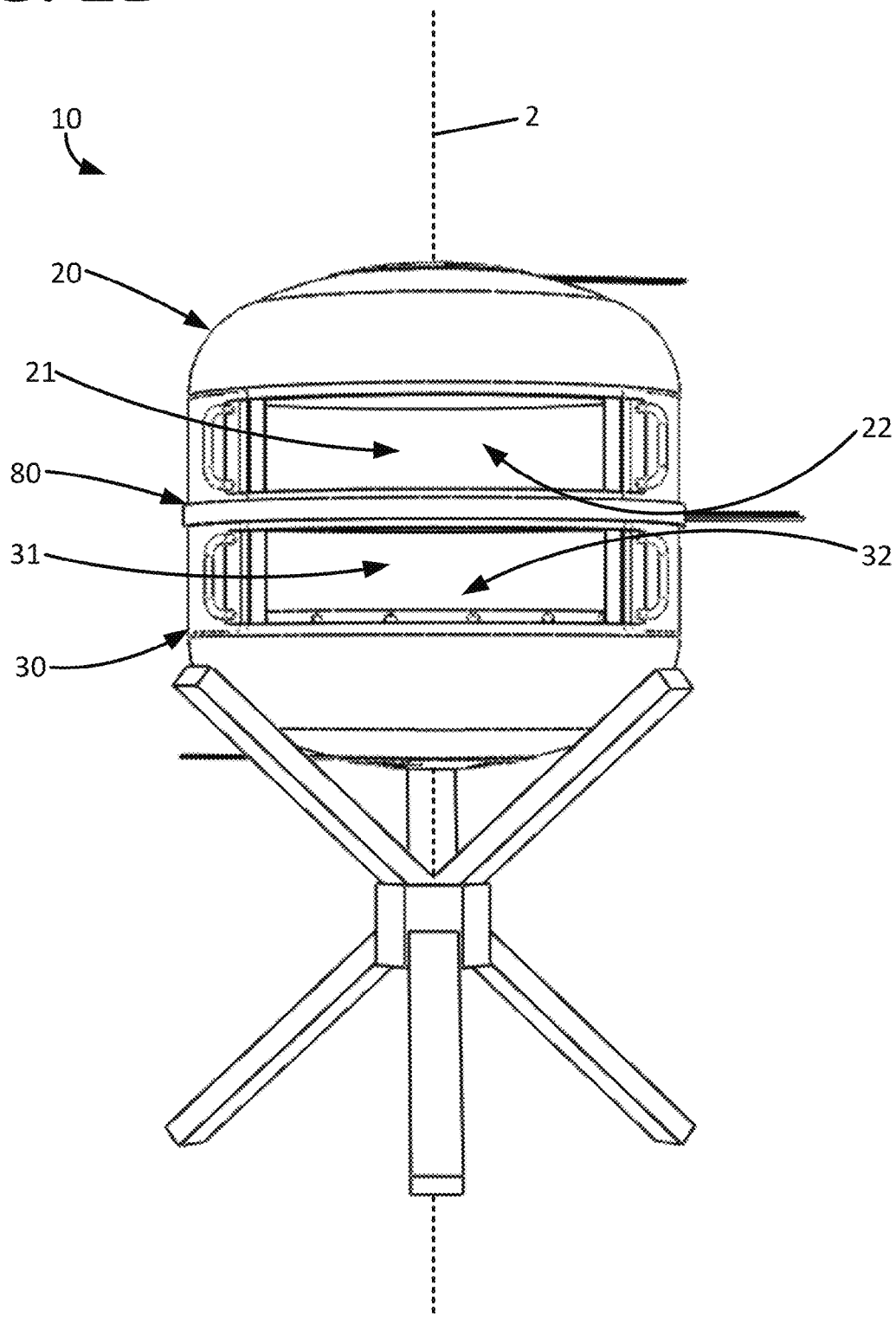

The upper portion 20 and the lower portion 30 may further define passages 21, 31, respectively, as shown in FIGS. 2A-2B and may include door apparatus 54, 56, respectively, as shown in FIGS. 1A-1B. The passage 21 of the upper portion 20 may be configured to allow the passage of consumable material such as, e.g., pizza, bread, naan, pita, cookies, etc. from outside of the oven 10 into the upper enclosed region 22. The passage 31 of the lower portion 30 may be configured to allow the passage of flammable materials such as wood, coal, charcoal, etc. from outside of the oven 10 in the lower enclosed region 32.

The door apparatus 54, 56 may be configured to open, close, and partially close the passages 21, 31, respectively. For example, each door apparatus 54, 56 may be configured in and between a closed configuration and an open configuration. When the door apparatus 54, 56 is in the open configuration, the passages 21, 31 may be open (e.g., which may allow passage of material into the enclosed volume, or region, 50 from outside of the oven 10). Conversely, when the door apparatus 54, 56 is in the closed configuration, the passages 21, 31 may be closed (e.g., to enclose the enclosed volume, or region, 50, to maintain heat within the enclosed volume, or region, 50, etc.).

The ability of the door apparatus 54, 56 be opened and closed to access the enclosed volume, or region, 50 without removing the upper portion 20 may be particularly advantageous. For example, if one were to be required to remove the upper portion 20 to locate a consumable item such as a pizza within the enclosed region, much of the heat within the enclosed volume, or region, 50 may escape.

As shown, the door apparatus 54, 56 are slidable door assemblies having two door portions 55, 57 that are configured to slide around the circumference of the oven 10 (e.g., slidable between the outer and inner walls) between the open and closed configurations. Further, the door apparatus 54, 56 may further include handle portions 59 arranged to be grasped by a user to slide the door portions 55, 57 into and between the open and closed configurations. The handle portions 59 may include insulative material to, e.g., be graspable by a user during use of the oven 10 so as to not harm (e.g., burn) the user's hands. The handle portions 59 may include approaches to insulate the handles from the inner surfaces and to be graspable by a user during use of the oven 10 so as to not harm (e.g., burn) the user's hands. Approaches to insulate or reduce heat transfer may include attachments with reduced cross-sections, attachments that only mate to the outer surface of 55 and 59, insulative materials, etc. The insulative material of the handle portions 59 may include polymers, ceramics, silica-based materials, etc.

The door portions 55, 57 may be configured to slide between the inner walls 26, 36 and the outer walls 27, 37 to be hidden from view when the door apparatus is configured in the open configuration. For example, the door portions 55, 57 may be located in the space 60 located between the inner and outer walls 26, 27, 36, 37. In other words, the door apparatus 54, 56 may provide "pocket doors."

In at least one embodiment, the door apparatus 54, 56 may include apparatus, or mechanisms, that link each door portion 55, 57 such that when one door portion is slide open, the other door portion opens without a user touching, or grasping, the door portion. In other words, an exemplary apparatus may link the two door portions so that pulling on one will pull the other one in an opposite and equal direction, effectively making "door opening" a one handed operation. The exemplary apparatus, or mechanism, may include a cable and pulley system (e.g., similar to the apparatus linking opposite ends of an expanding dining table).

Although the exemplary door apparatus 54, 56 each include two door portions 55, 57, it is to be contemplated that the door apparatus may include a single door portion or more than two portions that may be used in the exemplary ovens described herein. For example, an exemplary door apparatus may include single slidable door portion such that e.g., when a user has pizza or coals in one hand, the use may be able to slide the single portion open to locate the pizza or coals within the enclosed regions 22, 32.

Although the exemplary door apparatus 54, 56 may each include a sliding approach to opening and closing the doors, it is to be contemplated that the door apparatus 54, 56 may be opened and closed from a hinged apparatus. For example, the door apparatus 54, 56 may include hinge apparatus. The hinge apparatus may be coupled between the door portions 55, 57 and another portion of the oven 10. In other words, an exemplary door apparatus may include single swingable door portion such that e.g., when a user has pizza or coals in one hand, the use may be able to swing the single portion open to locate the pizza or coals within the enclosed regions 22, 32.

After locating a heat source (e.g., wood, coal, gas, charcoal, etc.) in the lower enclosed region 32 of the lower portion 30 of the oven, the temperatures within the lower enclosed region 32 and the upper enclosed region 22 may be controlled through the use of at least vent apparatus 70, 72.

Generally, the upper and lower portions 20, 30 may define one or more (e.g., two or more, etc.) vent openings 29, 39 extending through the wall portions from the enclosed volume, or region, 50 outside of the oven 10. The vent openings 29, 39 may be located proximate (e.g., around, about, etc.) the axis 2. In other words, the vent openings, 29, 39 may be located towards the center of each of the upper and lower portions 20, 30. Further, the vent openings 29 defined in the upper portion 20 may be located towards the uppermost portion of the oven 10 to, e.g., allow smoke, air, heat, etc. to escape from the enclosed volume, or region, 50 and the vent openings 39 defined in the lower portion 30 may be located towards the lowermost portion of the oven 10 to, e.g., allow the entrance of air into the enclosed volume, or region, 50. Additionally, the one or more vent openings 39 may be to allow combusted material to pass lower enclosed region 32 to outside of the oven 10 (e.g., consumed or combusted material may fall out of the vent openings 39).

Vent apparatus 70, 72 may be coupled to the upper and lower portions 20, 30, respectively, proximate the one or more vent openings 29, 39, respectively. The vent apparatus 70, 72 may be used to control the airflow through the vent openings 29, 39. For example, the vent apparatus 70, 72 may be configured in and between a closed position that restricts (e.g., stops, impedes, seals, etc.) airflow through the vent openings 29, 39 and an open position that allows airflow through the vent openings 29, 39. Although the two most extreme configurations, i.e., closed and open, are described, the vent apparatus 70, 72 may be configured anywhere between the closed and open configurations to vary the airflow through the vent openings 29, 39. In other words, the vent apparatus 70, 72 may be used to vary, or adjust, the amount of airflow through the vent openings 29, 39.

Although the functionality of the vent apparatus 70, 72 is described herein together, each of the vent apparatus 70 and the vent apparatus 72 may be configured differently (e.g., different than each other) by a user. For example, vent apparatus 70 may be closed while vent apparatus 72 may be open.

The amount of airflow through the vent openings 29, 39 may be used to vary the temperature within the enclosed volume, or region, 50. For example, allowing greater airflow through the vent openings 29, 30 may increase the oxygen available for combustion of the fuel located in the lower enclosed region 32, thereby increasing the temperature in the enclosed volume, or region, 50. A temperature differential between the outside air above vent 29 and the air within space 50 may also create an air flow or flue effect that further increases oxygen to the fire. Likewise, the adjustable vent openings 29, 30 can be used to damp this flue affect.

The oven 10 may further include cooking surface apparatus 91 that, generally, may be configured to provide a cooking surface 93 for receiving cookable material thereon to cook the cookable material. The cooking surface 93 may be configured to face the enclosed region 22 defined by the upper portion 20. The cooking surface apparatus 91 may be coupled to one or both of the upper portion 20 and the lower portion 30 to suspend the cooking surface apparatus 91 within the enclosed volume 50. As shown in FIG. 4, the cooking surface apparatus 91 is suspended between the upper portion 20 and the lower portion 30.

The exemplary oven 10 may further include heat control apparatus 80. As shown, the heat control apparatus 80 may be integrated with the cooking surface apparatus 91. In some embodiments, such as the embodiments depicted in FIGS. 15-19, the exemplary oven may not include heat control apparatus 80 (and may include cooking surface apparatus 91). Further, as shown in FIGS. 15-19, the cooking surface apparatus 91 may be coupled to one or both of the inner walls 26, 36 and not directly coupled to the outer walls 27, 37, e.g., so as to insulate the outer walls 27, 37 from the cooking surface apparatus 91. In other words, the cooking surface apparatus 91 may be configured such that heat may be restricted from being transferred, or transmitted, to outside of the enclosed volume 50 through the cooking apparatus 91 and the upper and lower portions 20, 30.

The airflow between the lower enclosed region 32 and the upper enclosed region 22 may be controlled using the heat control apparatus 80 located between the upper portion 20 and the lower portion 30. Similar to the vent apparatus 70, 72, the heat control apparatus 80 may generally be described as being configurable in and between a closed an open configuration. When in the open configuration, the heat control apparatus 80 may be configured to provide airflow (e.g., maximal airflow, etc.) between the lower enclosed region 32 (i.e., the enclosed region defined by the lower portion 30) and the upper enclosed region 22 (i.e., the enclosed region defined by the upper portion 20). When in the closed position, the heat control apparatus 80 may be configured to restrict airflow (e.g., no airflow, minimal airflow, etc.) between the lower enclosed region 32 and the upper enclosed region 22.

The cooking surface apparatus 91 may further include a baking, or heating, stone 90 located on a portion of the cooking surface apparatus 91 and/or heat control apparatus 80. For example, the underside 92 of the baking stone 90 may be adjacent a portion of the cooking surface apparatus 91 and/or heat control apparatus 80. More specifically, the baking stone 90 may be described has being located in the upper enclosed region 32 of the upper portion such that consumable material (e.g., pizza, bread, naan, pita, cookies, etc.) may be located on the cooking surface 93 defined by topside of the baking stone 90 during baking or cooking. The baking stone 90 may be generally configured to evenly distribute heat to the consumable material (e.g., a pizza, bread, naan, pita, cookies, etc.) placed thereon. The baking stone 90 may include stone, ceramic, earthenware, cordierite, etc. Further, the baking stone 90 may be porous to, e.g., assist in absorbing moisture resulting in a crisp crust. Other oven surfaces may be used in lieu of the baking stone including grated or flat surface for performing cooking operations where the characteristics of a baking stone are undesirable. For example, a grated or flat surface may be made of metal (e.g., stainless steel, steel, iron, etc.) or ceramic and may be used for grilling or searing operations of consumables that utilize such cooking methods (e.g. fish, meats, vegetables, etc.).

The heat control apparatus 80 may be configured to adjust the airflow directly to the underside 92 of the baking stone 90 to, e.g., control the temperature of the topside, or cooking, surface 94 of the baking stone 90 and also to adjust the airflow around the outside of the baking stone 90 to, e.g., control the temperature of the upper enclosed region 22. Through such control, a user may be able to precisely control and adjust the cooking environment within the enclosed volume, or region, 50 of the oven 10. For example, a user may use at least the heat control apparatus 80 and the vent apparatus 70, 72 to provide cooking temperatures within the enclosed volume, or region, 50 greater than or equal to 1000 degrees Fahrenheit and baking surface temperatures on the cooking surface 93 of greater than or equal to 700 degrees Fahrenheit to, for example, provide a proper cooking environment for classic Neapolitan-style pizza. For example, the heat control apparatus 80 may be configured such that the baking surface temperatures of the cooking surface 93 are different than the cooking environment within the enclosed volume, or region, 50 of the oven 10.

Further, although not depicted, the oven 10 may include one or more thermometers that gauge the temperature of various spaces and surfaces of the oven 10 that may be used for feedback to the operator of oven conditions and, thereby, the operator can adjust both the controls of heat apparatus 80 and vent apparatus 70, 72. The thermometers may gauge the air temperature of, e.g., regions 22, 32, the surface temperatures of the walls 26, 27, 36, 37, the topside 92 of the baking stone 90, etc. The thermometers may be mechanical (e.g. bi-metal, etc.), chemical (e.g. mercury, etc.), or electronic (e.g. thermo-couple, thermistor, etc.) in design, may be analog or digital, and may operate directly or remotely.

Generally, the oven 50 may be described as being capable of providing temperatures within the enclosed volume, or region, 50 using typical combustible materials (e.g. wood, charcoal, charcoal briquettes, coal, wood-base pellets, peat, gas, etc.) of greater than or equal to about 700 degrees Fahrenheit, greater than or equal to about 750 degrees Fahrenheit, greater than or equal to about 800 degrees Fahrenheit, greater than or equal to about 900 degrees Fahrenheit, greater than or equal to about 1000 degrees Fahrenheit, greater than or equal to about 1050 degrees Fahrenheit, greater than or equal to about 1100 degrees Fahrenheit, greater than or equal to about 1200 degrees Fahrenheit, less than or equal to about 1500 degrees Fahrenheit, less than or equal to about 1400 degrees Fahrenheit, less than or equal to about 1300 degrees Fahrenheit, less than or equal to about 1200 degrees Fahrenheit, less than or equal to about 1100 degrees Fahrenheit, and/or less than or equal to about 1000 degrees Fahrenheit. Further, the oven 50 may be described as being capable of providing surface temperatures on the cooking surface 93 using typical combustible materials (e.g. wood, charcoal, charcoal briquettes, coal, wood-base pellets, peat, etc.) of greater than or equal to about 500 degrees Fahrenheit, greater than or equal to about 600 degrees Fahrenheit, greater than or equal to about 700 degrees Fahrenheit, greater than or equal to about 800 degrees Fahrenheit, greater than or equal to about 900 degrees Fahrenheit, less than or equal to about 1100 degrees Fahrenheit, less than or equal to about 1000 degrees Fahrenheit, less than or equal to about 900 degrees Fahrenheit, and/or less than or equal to about 800 degrees Fahrenheit.

As shown, the heat control apparatus 80 includes three portions: namely, a central portion 82, a top (or first) movable portion 84, and a bottom (or second) movable portion 86. As depicted, the central portion 82 as well as the remainder of the heat control apparatus 80 generally lays along a plane that is perpendicular, or normal, to axis 2. The top movable portion 84 may be located on top of the central portion 82 and the bottom movable portion 86 may be located below the central portion 82. The heat control apparatus 80 may be removable from (e.g., removable coupled) or fixed to (e.g., fixedly coupled) the lower portion 30. As depicted, the heat control apparatus 80 is removable from the lower portion 30 by removing the upper portion 20, and then removing the heat control apparatus 80 from resting on the lower portion 30.

The central portion 82 defines a plurality of openings 83 and extends across the enclosed volume, or region, 50 of the oven 10 when located therein. The openings 83 allow may airflow between the lower enclosed region 32 and the upper enclosed region 22. When a heat source is provided in the lower enclosed region 32, heated air will generally flow upwardly from proximate the heat source through the openings 83 into the upper enclosed region 22. Although, as depicted the openings 83 are wedged-shaped or partial-wedge shaped openings, it is to be contemplated the openings 83 may be any shape such as, e.g., circular, square, etc.

The movable portions 84, 86 are locatable proximate the plurality of openings 83 of the central portion 82 to, e.g., control the airflow through the openings 83. More specifically, the movable portions 84, 86 may be configured to move with respect to the central portion 82 to block (e.g., occlude, seal, etc.), partially block, or not block the openings 83. Similar to the vent apparatus 70, 72 described herein, the movable portions 84, 86 may be configured in and between a closed position and an open position. When one of the movable portions 84, 86 is in a closed position, the movable portion 84, 86 is located with respect to the central portion 82 to restrict airflow (e.g., provide minimal airflow, provide no airflow, etc.) through the plurality of openings 83 (e.g., between the lower and upper enclosed regions 32, 22). Likewise, when one of the movable portions 84, 86 is in an open position, the movable portion 84, 86 is located with respect to the central portion 82 to provide airflow (e.g., maximal airflow) through the plurality of openings 83 (e.g., between the upper and lower enclosed regions 22, 32). Further, the movable portions 84, 86 may be configured (e.g., positioned, located, manipulated, etc.) anywhere between the closed and open positions to adjust, or vary, the airflow between the upper and lower enclosed regions 22, 32. Moreover, the movable portions 84, 86 may be configured independently.

Figure 13:
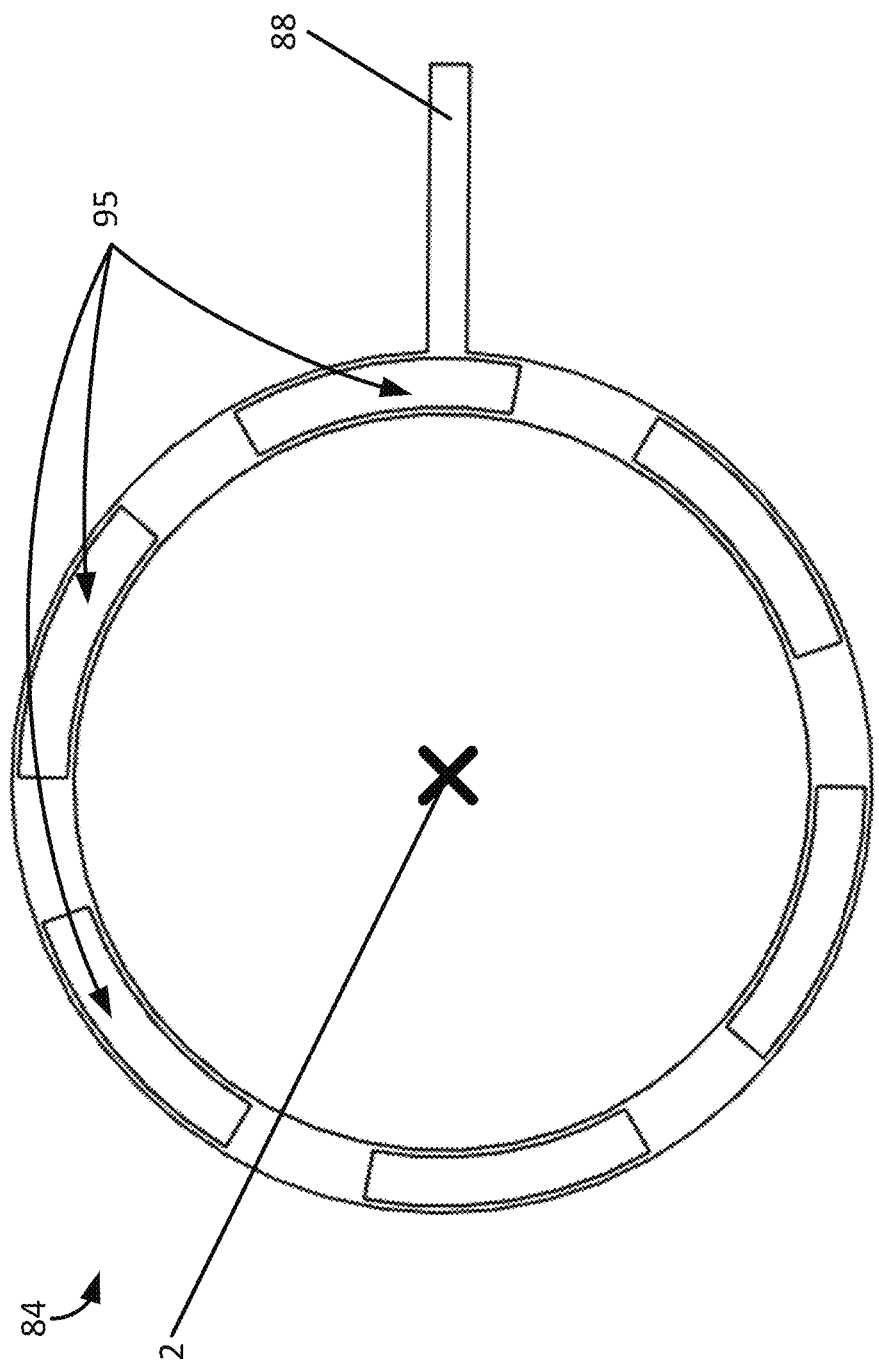
FIG. 13 is a top view of a top movable portion of the heat control apparatus of FIG. 9.
Figure 14:
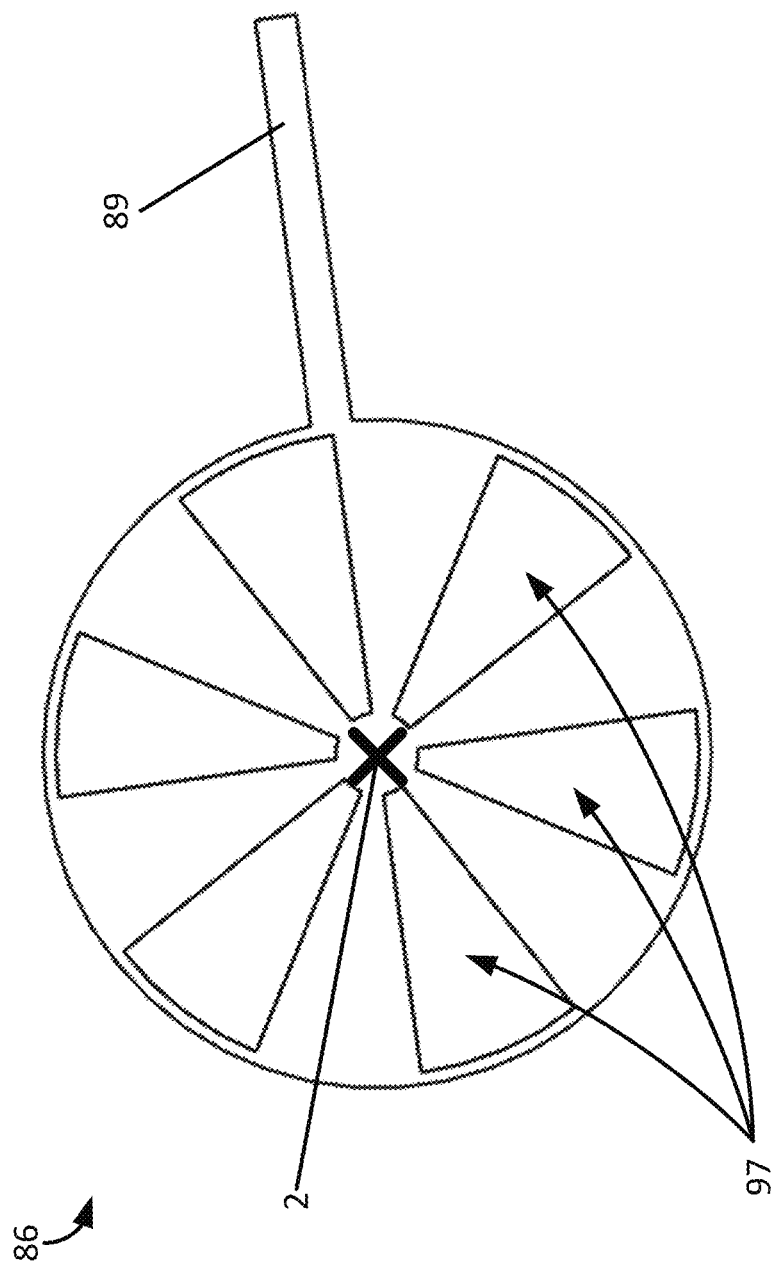
FIG. 14 is a top view of a bottom movable portion of the heat control apparatus of FIG. 9.

Further, the top movable portion 84 may define a plurality of openings 95 extending therethrough as shown in FIG. 13, and the bottom movable portion 86 may define a plurality of openings 97 extending therethrough as shown in FIG. 14. Such openings 95, 97 may be configured, or located, to function, or work in conjunction, with the openings 83 of the central portion 82. For example, the openings 95, 97 may not be "lined up" with the openings 83 to restrict airflow therethrough when the heat control apparatus 80 is in a closed configuration, and the openings 95, 97 may be "lined up" with the openings 83 to allow airflow therethrough when the heat control apparatus 80 is in an open configuration.

Although the embodiment depicted herein includes two movable portions 84, 86, it is to be contemplated that the exemplary heat control apparatus 80 may include one movable portion or more than two movable portions. The two movable portions 84, 86 described herein, however, may be configured to adjust airflow to two particular regions within the oven 10. For instance, certain cooking conditions may prefer a heating or cooking surface (e.g., adjacent the consumable material) that is cooler than the cooking air temperature (e.g., surrounding the consumable material). As such, the heat control apparatus 80 depicted herein is configured to control the airflow to two separate regions (e.g. non-overlapping regions): an outer ring region 85; and an inner circular region 87 surrounded by the outer ring region 85 as depicted using dotted lines in FIG. 12. Furthermore, the inner ring region 87 may have a gap between the movable portion 86 and bottom baking stone surface 92 to provide an isolative region to further reduce heat transfer to the baking stone to, e.g., produce a temperature differential between baking stone 90 and the internal air and surfaces of upper portion 20.

The outer ring region 85 may lie outside of the area where the baking stone 90 lies such that airflow that flows through the outer ring region 85 may not directly impinge the baking stone 90 while entering the upper enclosed region 22 from the lower enclosed region 32. Conversely, the inner circular region 87 may lie inside the area wherein the baking stone 90 lies such that airflow that flows through the inner circular region 87 may directly impinge the baking stone 90 while entering the upper enclosed region 22 from the lower enclosed region 32.

Each of the movable portions 84, 86 may be configured to affect one of the outer ring region 85 and the inner circular region 87 such that a single movable portion may be used to adjust the airflow for each region separately. As shown, the top movable portion 84 may be configured to lie in the outer ring region 85 to control, or adjust, the airflow through the outer ring region 85, and the bottom movable portion 86 may be configured to lie in the central circular region 87 to control, or adjust, the airflow through the central circular region 87.

The movable portions 84, 86 may have various methods of attachment to each other and their respective mounting structures including, e.g. rivets, pins, bolts, or channels. The exemplary attachment methods indicated herein may provide control of the vent openings 29, 39 by a rotation about the axis 2. Other control methods may include slidable portions or flippable flaps may also control airflow through the oven.

The movable portions 84, 86 may include a handle portion 88, 89, respectively, that may extend outside of the oven 10 such that a user may move, or rotate, the movable portions 84, 86 to adjust the airflow in each of the outer ring and inner circular regions 85, 87 without removing the upper portion 20 of the oven (e.g., to maintain, or keep, the heat within the enclosed volume, or region, 50, etc.).

Due to the circular nature of the oven 10, the movable portions 84, 86 may be movable about the axis 2 with respect to the central portion 82 to block, partially block, or not block the openings 83 of the central portion 82. In other words, the movable portions 84, 86 may be rotatable about the axis 2 in and between the closed and open configurations. Due to the rotational behavior of the movable portions 84, 86, the heat control apparatus 80 may remain substantially planar (e.g., lie substantially in a plane, no portions extending into either of the upper and lower enclosed regions 22, 32) when in or between the closed and opening configurations.

Although the heat control apparatus 80 is generally circular and the movable portions 84, 86 are rotatable about axis 2 and with respect to the central portion 82, it is to be understood that other configurations are contemplated.

Figure 7:
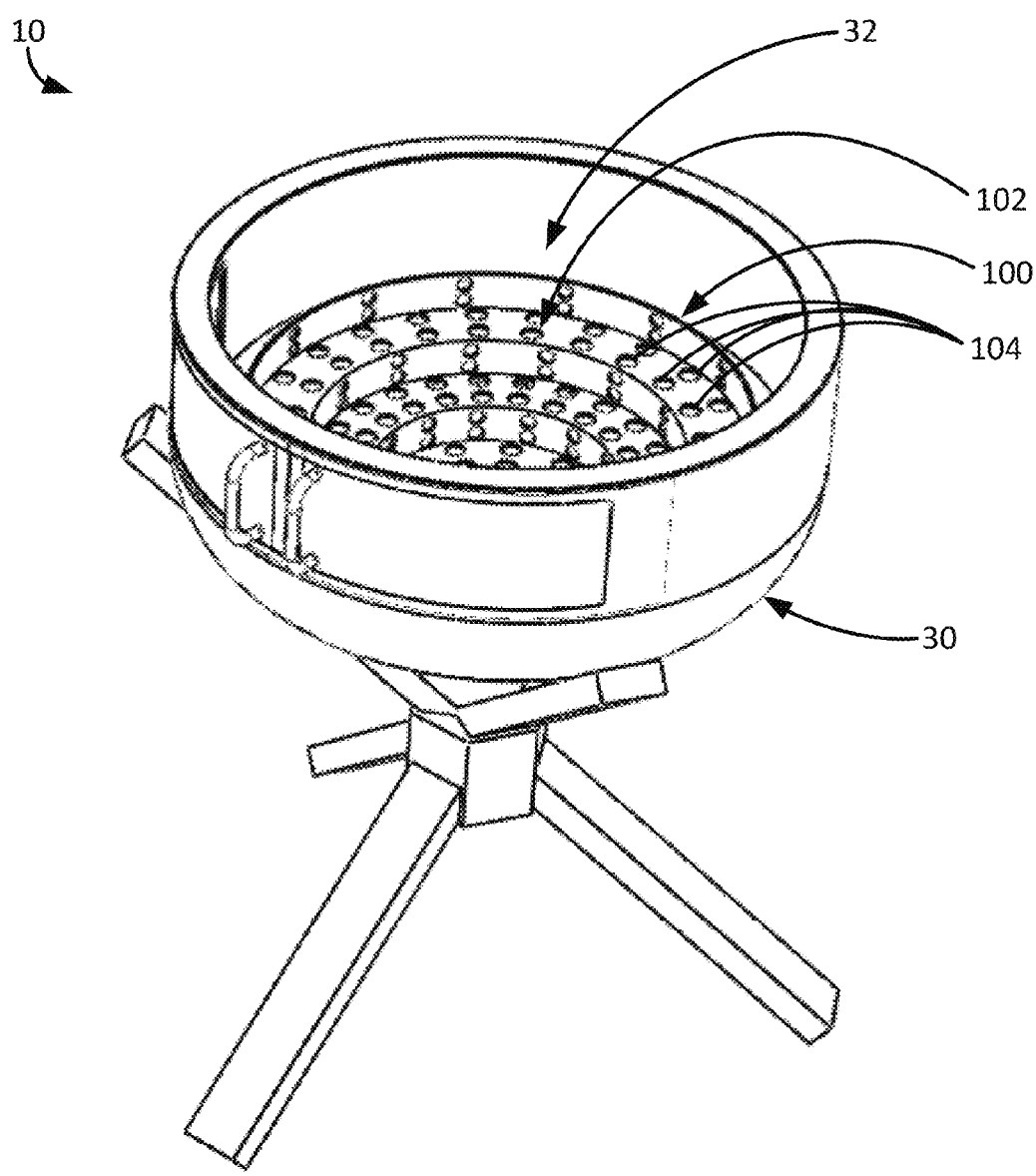
FIG. 7 is a perspective view of the lower portion and fire bowl apparatus of FIG. 6 without the heat control apparatus.
Figure 8:
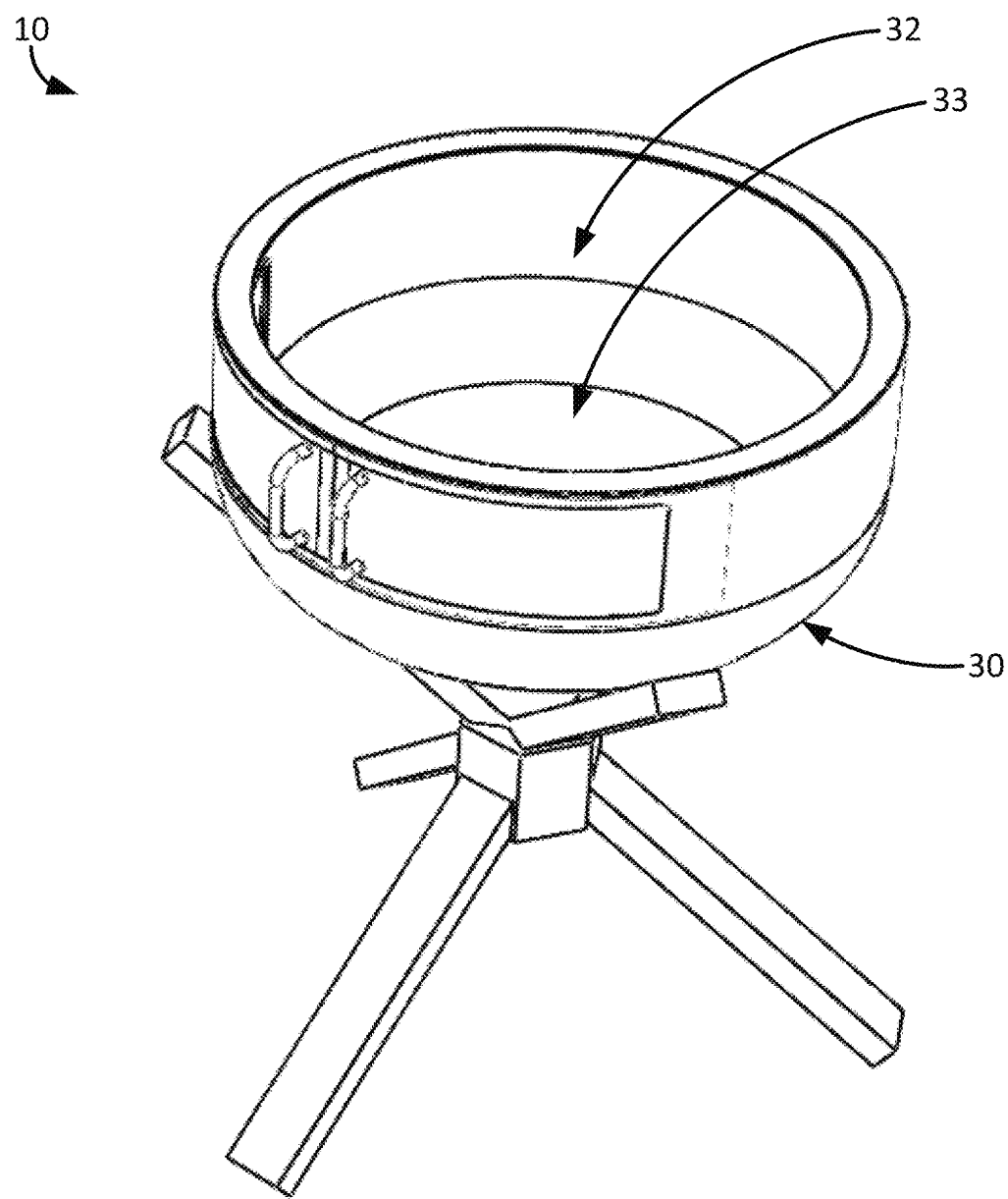
FIG. 8 is a perspective view of the lower portion of FIG. 7 without the fire bowl apparatus.
Figure 9:
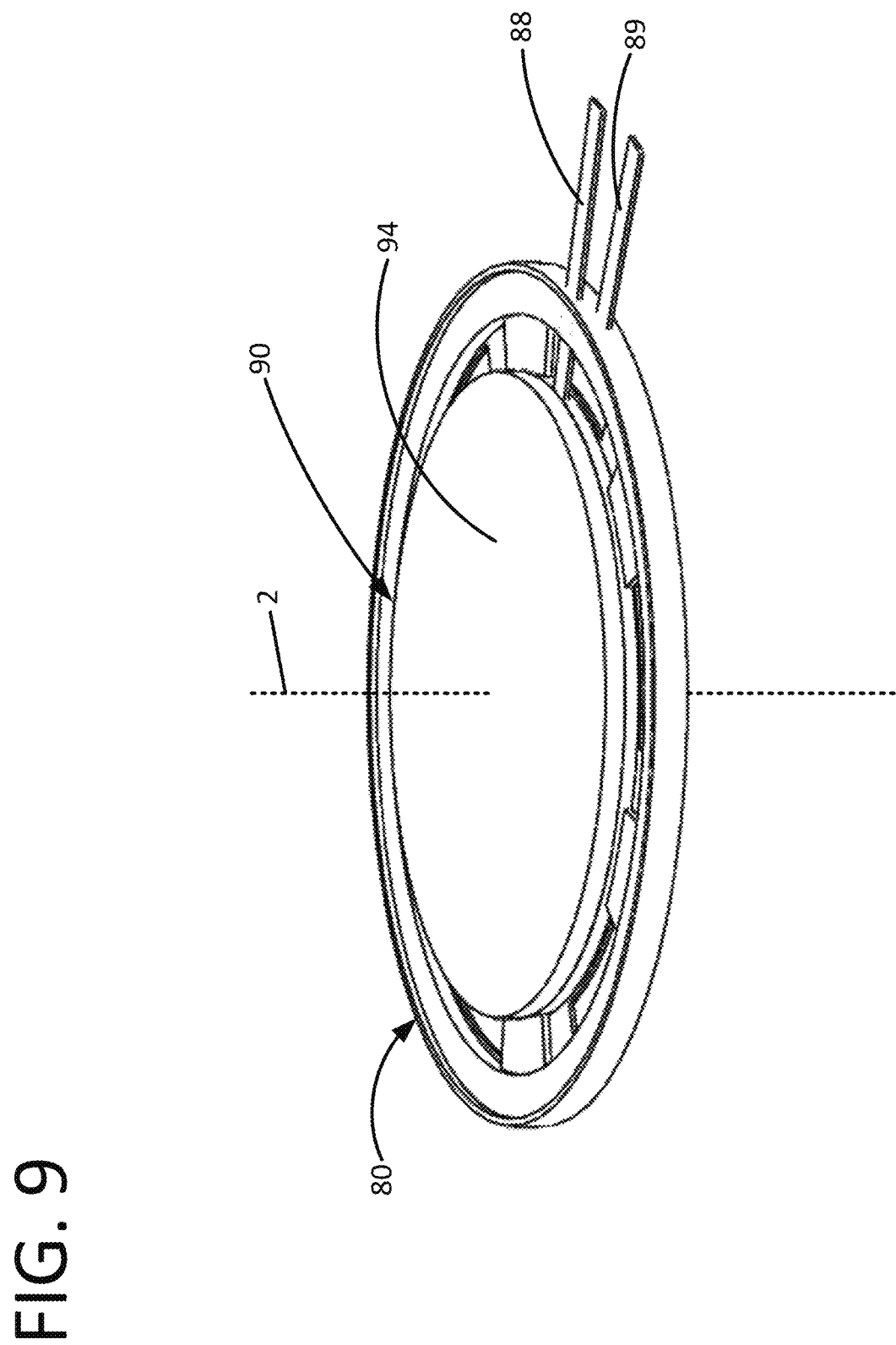
FIG. 9 is a perspective view of the heat control apparatus and baking stone of the oven of FIG. 1.
Figure 10:
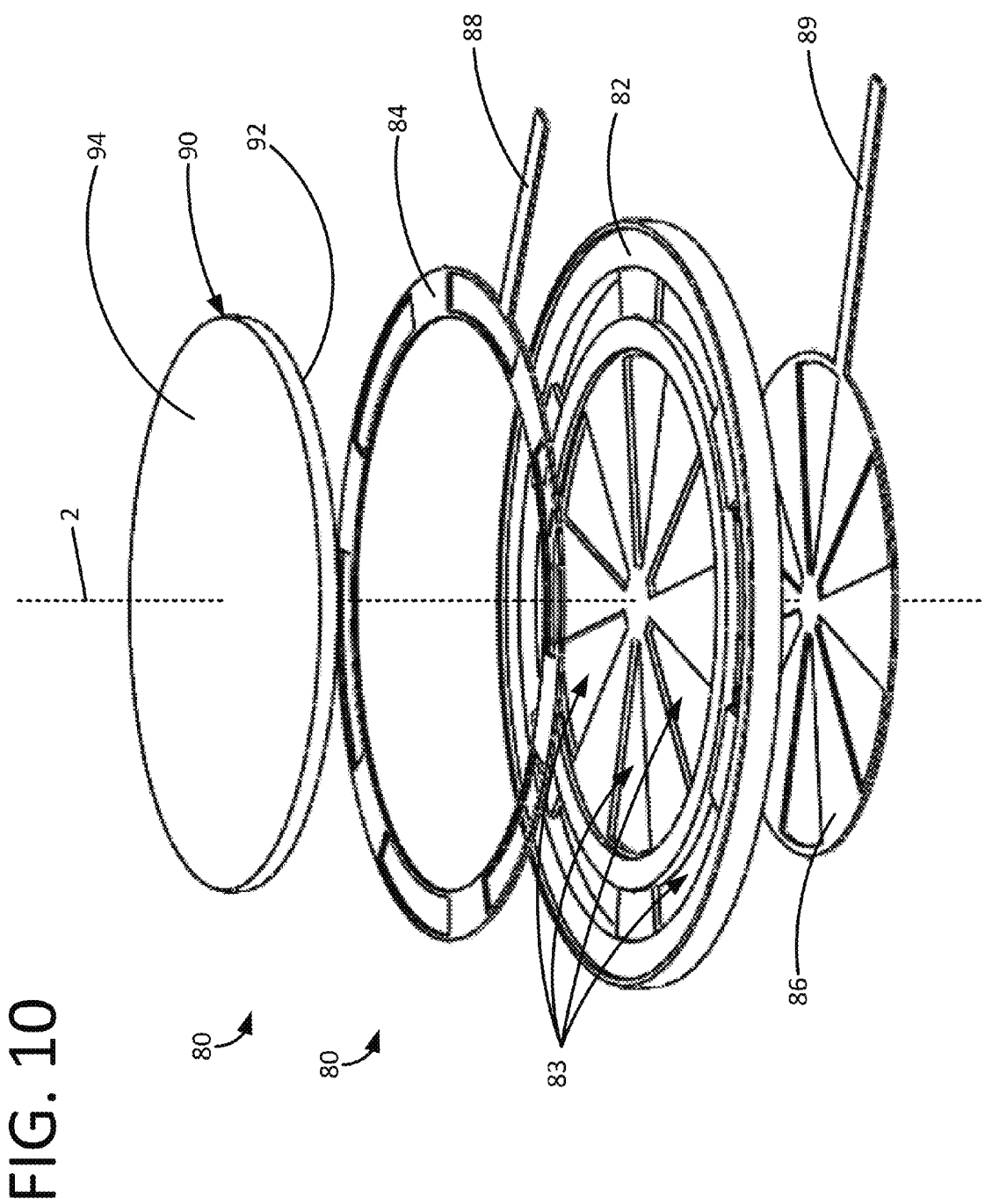
FIG. 10 is an exploded, perspective view of the heat control apparatus and the baking stone of FIG. 9.
Figure 11:
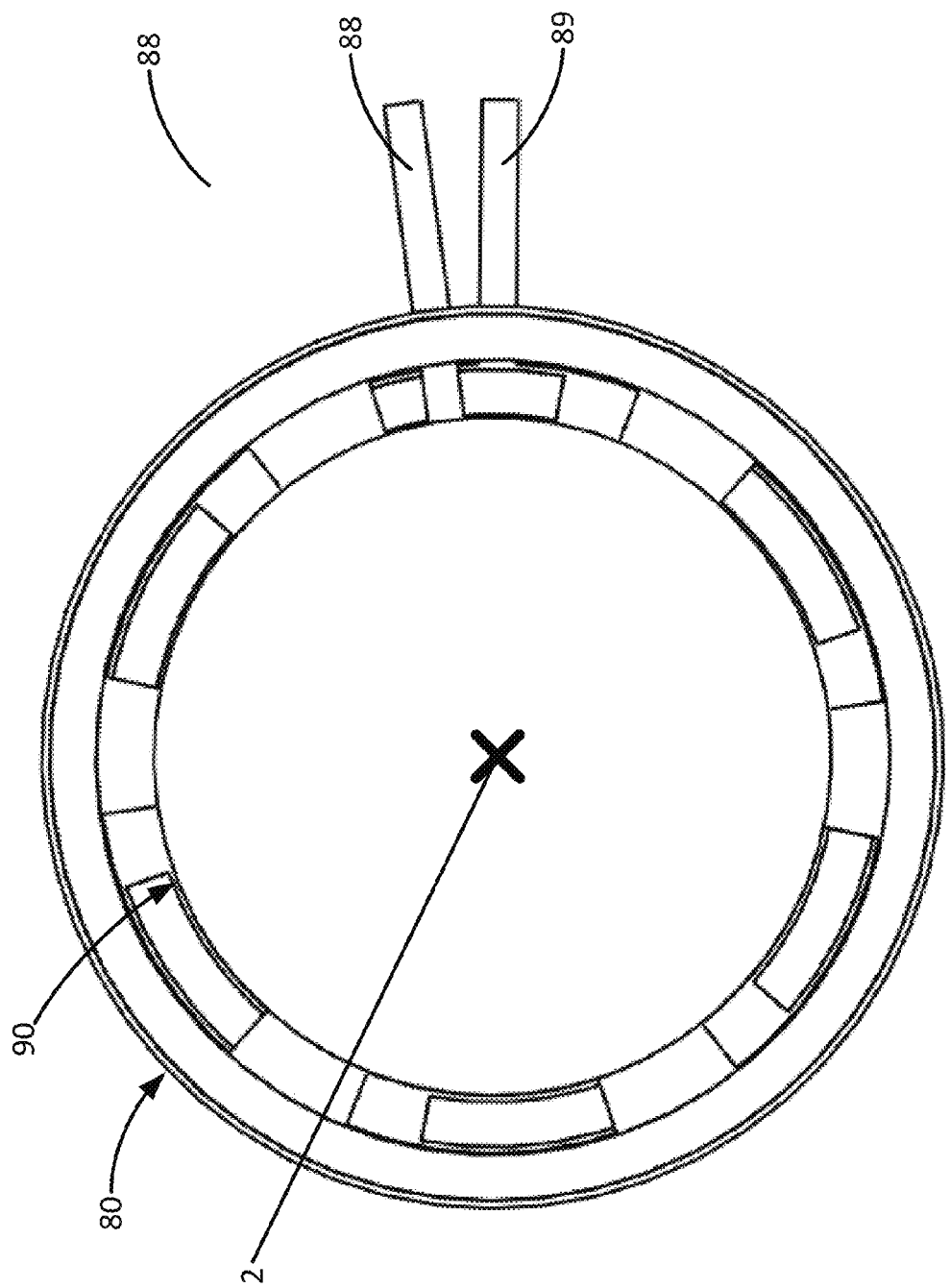
FIG. 11 is a top view of the heat control apparatus and the baking stone of FIG. 9.
Figure 12:
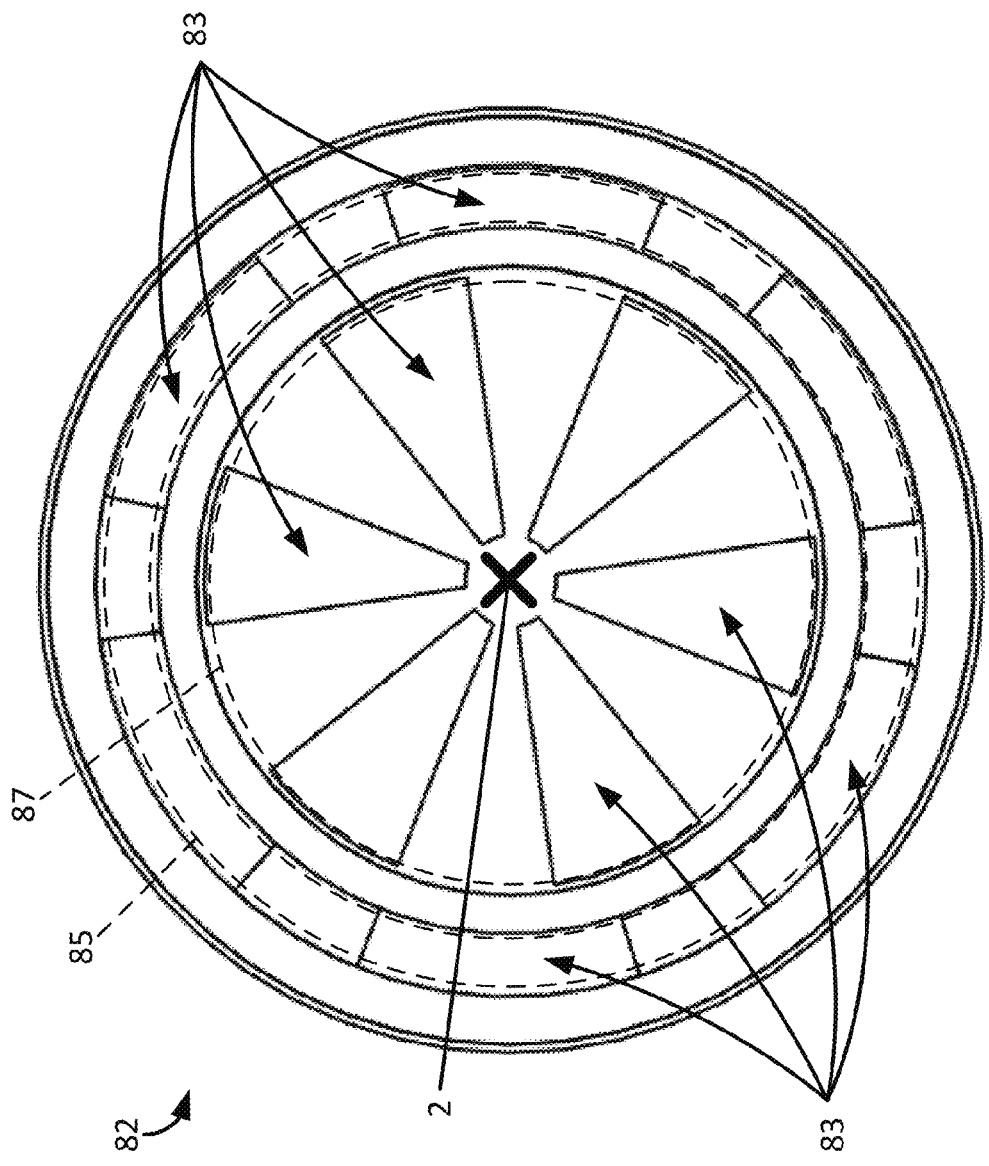
FIG. 12 is a top view of a central portion of the heat control apparatus of FIG. 9.

One exemplary fire bowl apparatus 100 is shown in FIGS. 3-4 and 7. The fire bowl apparatus 100 may provide containment and structure for the combustible material or fuel to be located in the oven 10. Generally, the fire bowl apparatus 100 may be configured to allow airflow from beneath the fire bowl apparatus 100 into the region, or bowl, where the combustible material is located. The region, or bowl, may be defined as a stepped-inverted conical region 102 configured to hold combustible material. In other words, the inverted conical region the fire bowl apparatus 100 defines may be stepped like a staircase. Further, the fire bowl apparatus 100 may define a plurality of apertures 104 through the fire bowl apparatus 100 configured to allow airflow from outside of the inverted conical region 102 to inside the inverted conical region 102. Additionally, the plurality of apertures may allow combusted, consumed, and/or spent combustible material to fall therethrough to be discharged through one or more vent openings 39.

In the embodiment depicted, the fire bowl apparatus 100 is a tiered structure with annular steps that increase in diameter with subsequent higher steps. The steps of the fire bowl apparatus 100 may be configured to hold fuel in place as it burns and decreases in volume, allowing for oxygen to flow to the fuel throughout the combustion process. The increasing diameter of the apparatus 100, and thus, the diameter of the inverted conical region 20 may further provide a geometry for natural progression of combustion of the fuel. For example, high-temperature gases from combustion located in a lower tier may expand and rise, overpassing the fuel of higher tiers, and increasing the temperature and volatility of the fuel of the higher tiers, which, in turn, may increase the rate of combustion of the fuel. The plurality of apertures 104, or vent holes, through the fire bowl apparatus 100 may provide ability for oxygen to flow to the fuel for combustion. While the fire bowl apparatus 100 shown is a sheet-metal structure with multiple through holes or apertures, it is understood that other approaches are contemplated. These approaches may include, e.g., grated, wire, or mesh configurations of the same tiered and vented nature.

Figure 15:
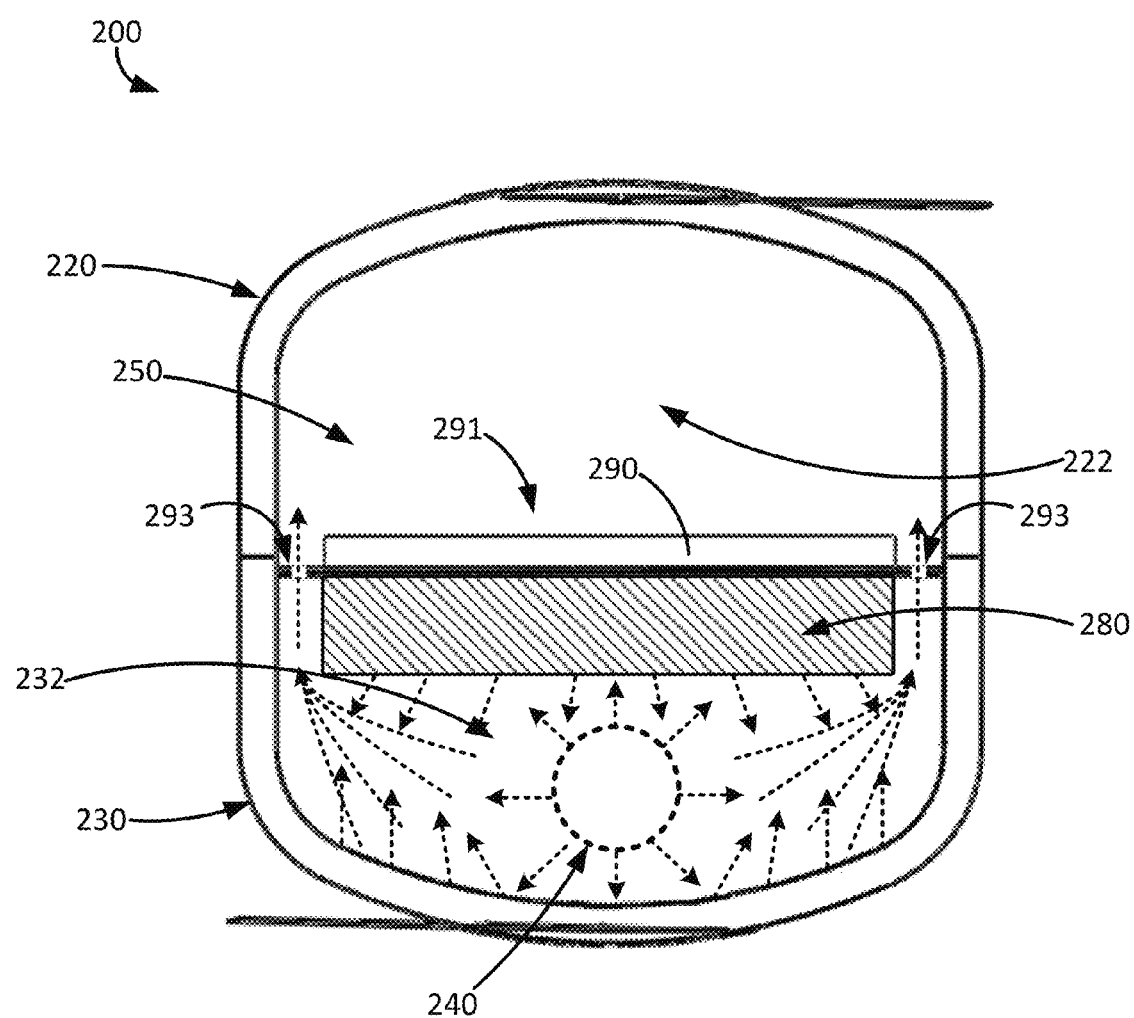
FIG. 15 is a cross-sectional view of an exemplary pizza oven.

Another exemplary oven 200 is depicted in FIG. 15. As shown, the oven 200 includes an upper portion 220 and a lower portion 230 defining an enclosed volume 250. Further, the enclosed volume 250 defined by the upper portion 220 may be referred to as the enclosed upper region 222 and the enclosed volume 250 defined by the lower portion 230 may be referred to as the enclosed lower region 232. Many of the elements and/or features of the oven 200 may be similar to the oven 10 described herein with respect to FIGS. 1-8, and as such, will not be described further herein.

The exemplary oven 200, as well as the other exemplary ovens described herein, may be configured to provide laminar fluid flow of heated fluid from the lower enclosed region 232 to the upper enclosed region 222 (e.g., laminar fluid flow in the cylindrical region between the two regions 232, 222, etc.). More specifically, the surfaces and structures (e.g., such as the cylindrical shape, domed/curved ends, smooth surfaces, etc.) defining the enclosed region 250 may facilitate steady and consistent airflow and less turbulent airflow from the lower enclosed region 232 to the upper enclosed region 222. The laminar airflow provided by the exemplary ovens may provide consistent cooking temperatures through the upper enclosed region (e.g., such that the cooking surface does not need to be rotated or moved to provide even cooking of cookable materials, etc.). The surfaces defining the enclosed region 250 may be described as being continuous, corner-less surfaces to provide the laminar and consistent fluid flow of heated fluid from the lower enclosed region 232 and the upper enclosed region 222.

In other words, the exemplary ovens may provide a continuity of the upper and lower inner surfaces to form a manifold without corners to provide a laminar flow with consistent flow of heated fluid with reduced losses and consistent characteristic across the perimeter from the lower enclosed region to the upper enclosed region to increase the rate of heat transfer from the lower volume to the upper volume. The airflow between the lower portion and the upper portion may be further described as being streamlined (e.g., with little turbulence, etc.) as it moves across and proximate to the interface between the lower portion and the upper portion.

The heat control apparatus 280 of the oven 200 is configured to control airflow between the enclosed upper region 222 and the enclosed lower region 232 through, e.g., the use of apertures 293. The apertures 293 may be located in an annular ring (when viewed from above in a plan view, e.g., in a view perpendicular to a vertical axis) extending around the cooking surface apparatus 290 such that air may flow around the cooking surface apparatus 290 into the enclosed upper region 232. In other words, the heat control apparatus 280 may define a circular region where the baking stone 290 is located and a ring region located outside of the circular region (around the baking stone 290) and the ring region may define the plurality of apertures 293 to allow airflow in the enclosed volume 50 between the lower portion 30 and the upper portion 20.

The heat control apparatus 280 may be further configured to restrict radiant energy directly transmitted from a heat source 240 to the cooking surface apparatus 290. For example, dotted line arrows extend from the heat source 240 loosely representing radiant heat and/or heated airflow. The radiant heat extending from the heat source 240 may be at least partially reflected from the heat control apparatus 280, e.g., back into the enclosed lower region 232 before being transmitted, reflected, and/or absorbed into and from the inner walls of the lower portion 230, and ultimately into the enclosed upper region 222.

Figure 16:
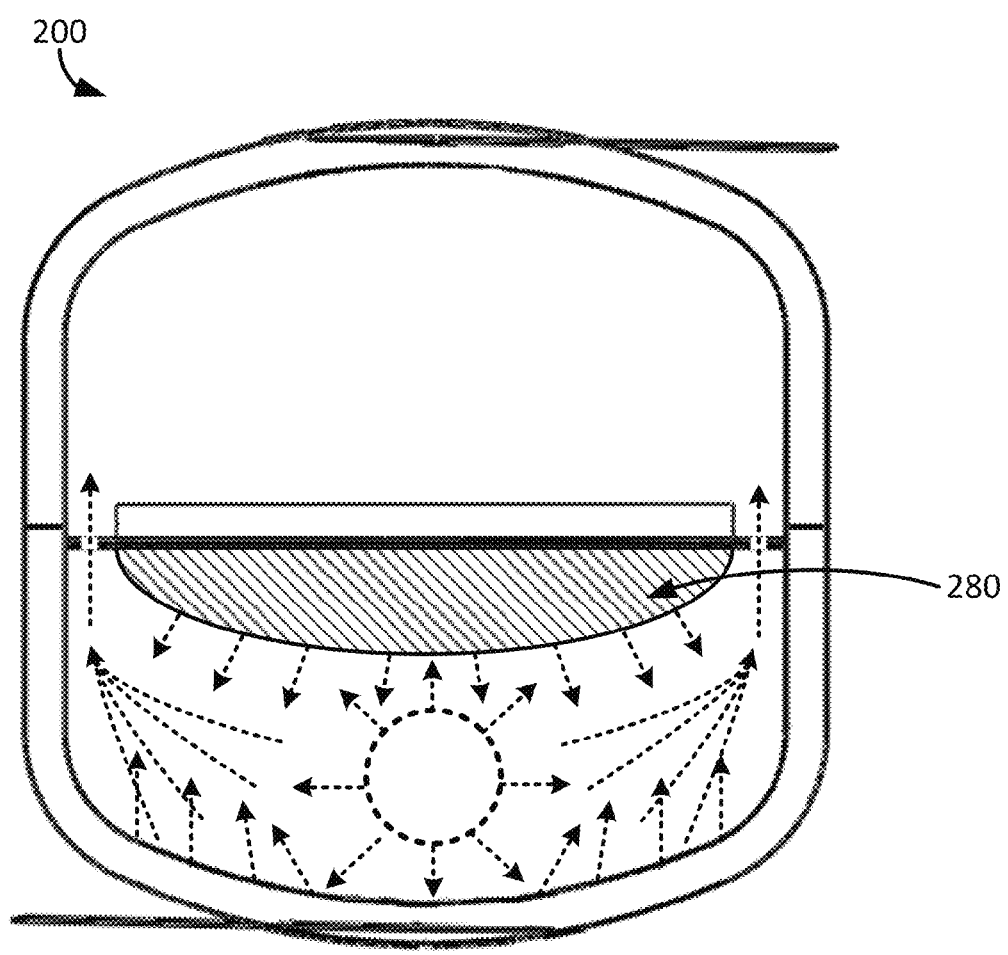
FIG. 16 is a cross-sectional view of an exemplary pizza oven.

The heat control apparatus 280 may include a layer of material such as metal and an air gap between the layer of metal and the cooking surface apparatus 291. In at least one embodiment, the air gap may include insulative material (such as described herein and represented by the crosshatching). The heat control apparatus 280 may define various sizes and/or shapes. For example, as shown in FIG. 16, the heat control apparatus 280 may define an inverted dome or concave wall extending into the enclosed lower region 232. The inverted dome or concave wall may be configured to direct airflow from the lower enclosed region 232 to around the heat control apparatus 280 to the upper enclosed region 222.

Generally, the heat control apparatus 280 may provide less heat transfer (e.g., radiant heat transfer, convective heat transfer, etc.) to the cooking surface apparatus 291 (in particular, the baking stone 290) from the underside thereof (i.e., the side facing the lower enclosed region 232). In other words, direct heat transfer from the heat source 240 to the cooking surface of the cooking surface apparatus 291 may be restricted or impaired by the heat control apparatus 280. As a result, the cooking surface of the cooking surface apparatus 291 may have a lower temperature than the temperature of the enclosed region 222, which, e.g., may allow a crispy crust without burning the crust but still allowing high temperatures to be in the upper enclosed region 222.

Figure 17:
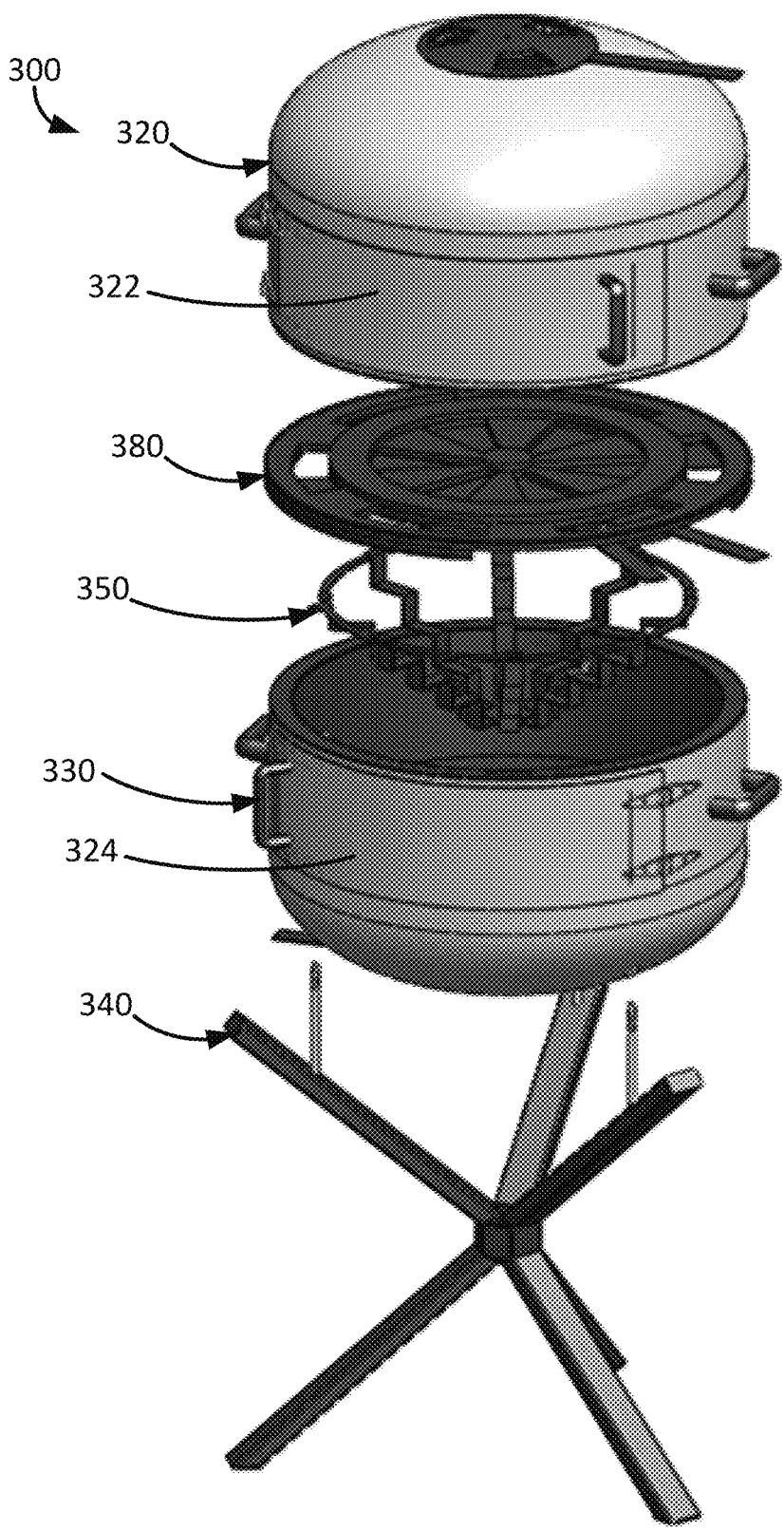
FIG. 17 is an exploded, perspective view of an exemplary pizza oven.
Figure 19:
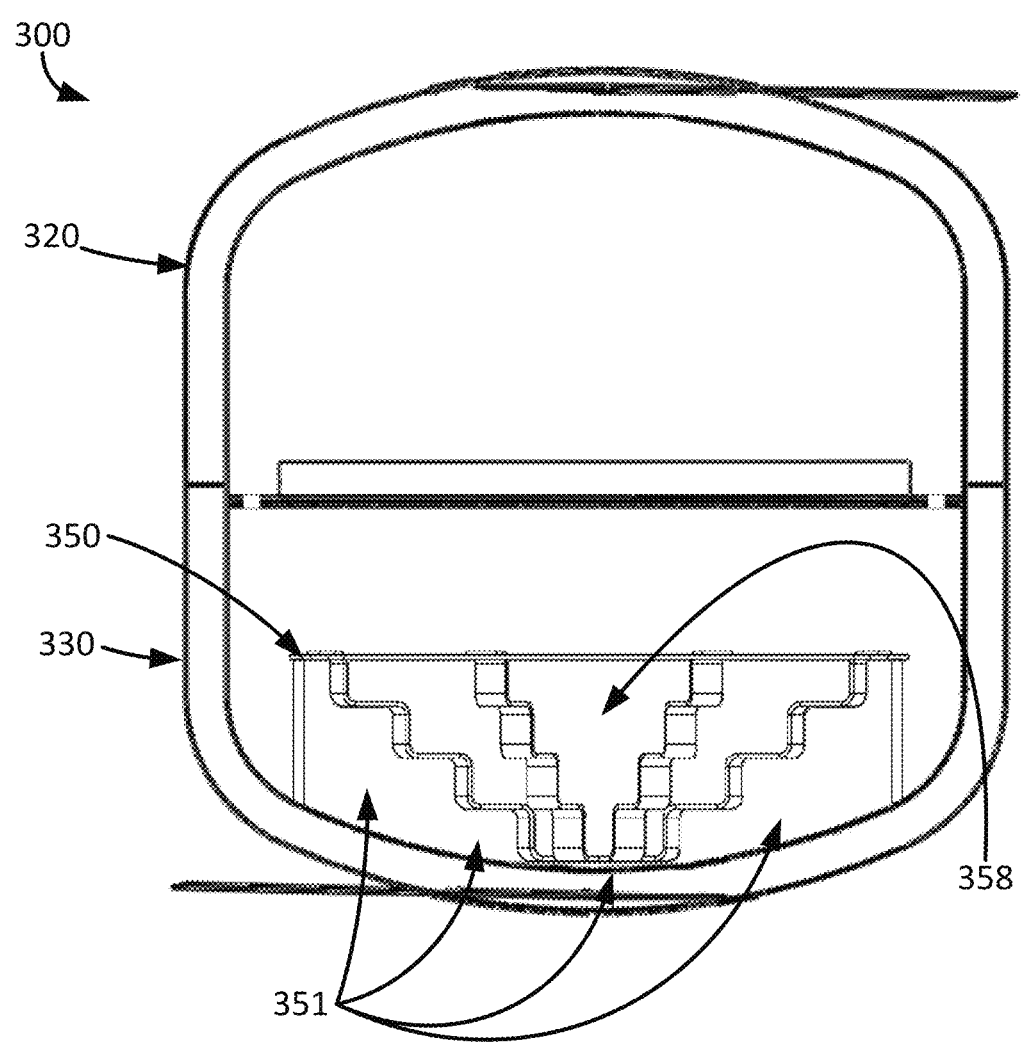
FIG. 19 is a cross-sectional view of the pizza oven of FIG. 17.

An exploded view of another exemplary oven 300 is depicted in FIG. 17. As shown, the oven 300 includes a top portion 320, a lower portion 330, a stand 340, and heat control apparatus 380 similar to the embodiments described herein, and as such, may not be further described herein.

The door apparatus 322, 324 of the upper and lower portions 320, 334 of the exemplary oven 300, however, includes a single swinging, or hinged, door. Additionally, the fire bowl apparatus 350 includes a plurality of radially extending arm members as well as other features that will be described further herein with respect to FIGS. 19-21.

Figure 18:
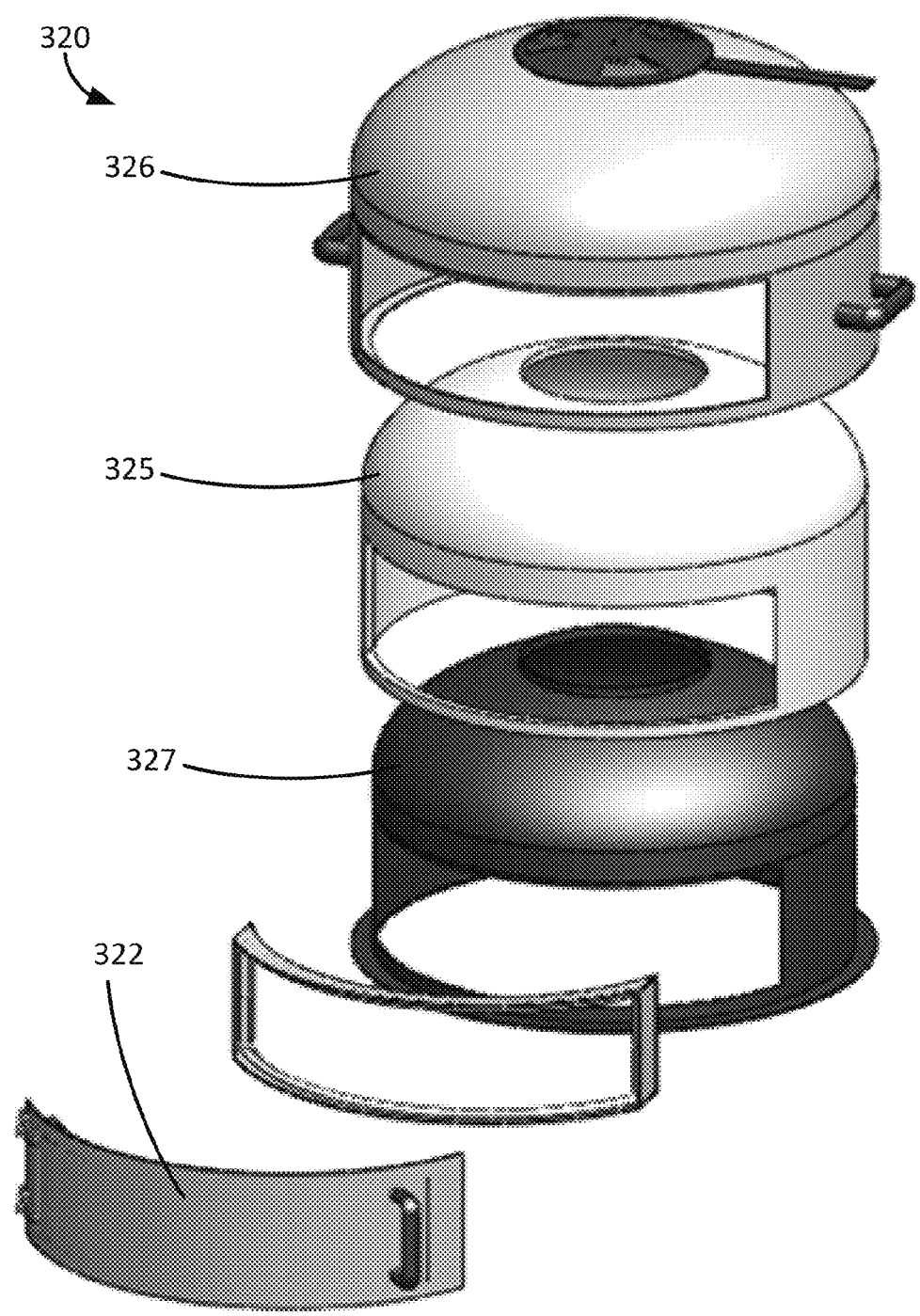
FIG. 18 is an exploded, perspective view of an exemplary upper portion of the oven of FIG. 17.

An exploded view of the upper portion 320 is depicted in FIG. 18. As shown, the upper portion 320 includes an outer wall 326, an inner wall 327, and insulation 325 located between in the outer wall 326 and the inner wall 327.

Figure 20:
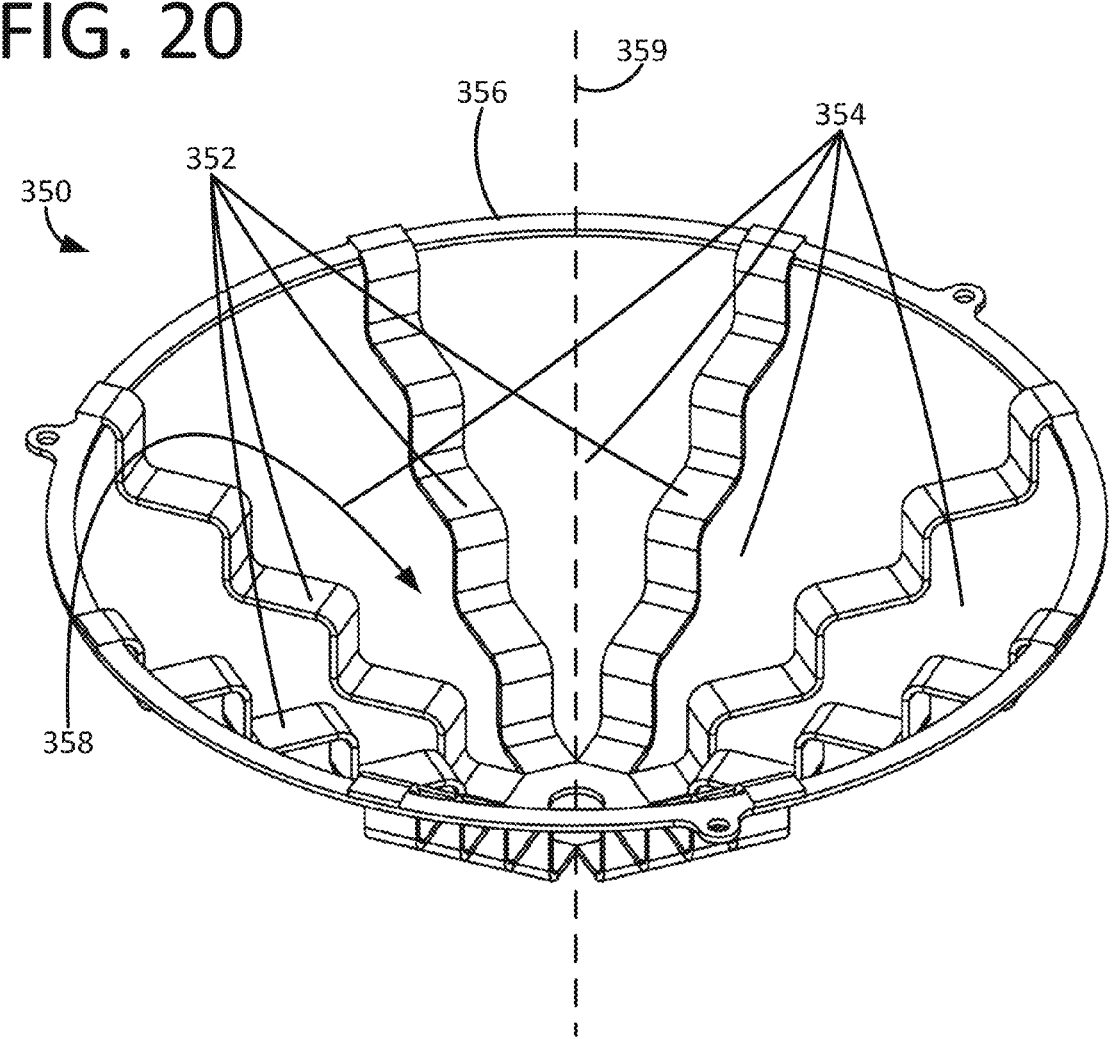
FIG. 20 is a perspective view of an exemplary firebowl apparatus of the pizza oven of FIG. 17.

The fire bowl apparatus 350 coupled to the lower portion 330 (e.g., coupled using bolts, welded, etc.) is depicted in the cross sectional view of FIG. 20. As shown, the fire bowl apparatus 350 is located in the lower portion 330 (the enclosed volume defined by the lower portion 330) and configured to hold combustible material away from an inner wall of the lower portion 330 to allow airflow around and through the fire bowl apparatus 350. In other words, space may be defined around the fire bowl apparatus 330 such that air may flow through the bottom of the fire bowl apparatus as depicted by arrows 351. As such, the fire bowl apparatus 350 may facilitate increased airflow in and around combustible material located therein.

Figure 21:
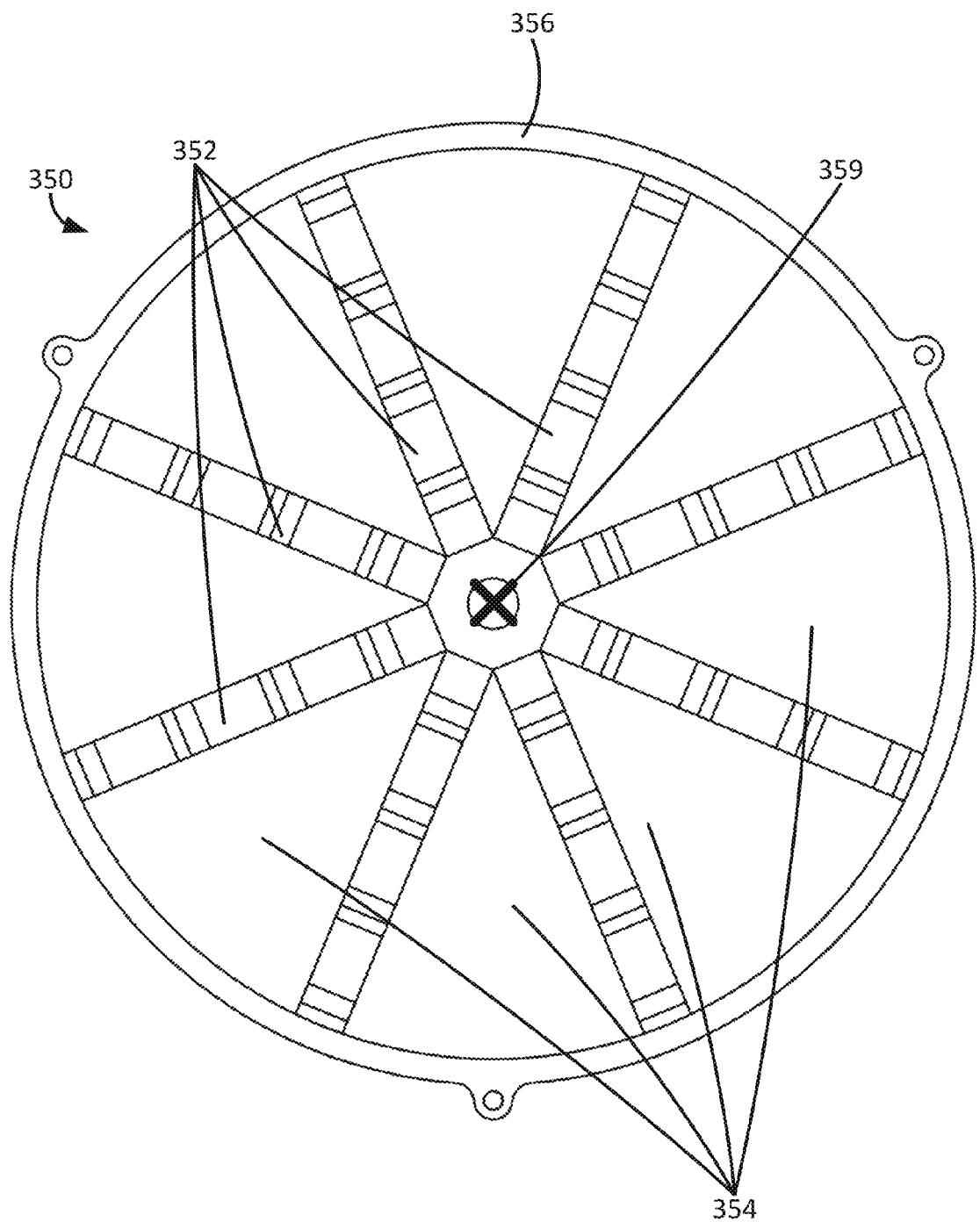
FIG. 21 is a plan view of the firebowl apparatus of FIG. 20.

As shown in FIGS. 20-21, the fire bowl apparatus 350 may include a plurality of radially extending arm members 352 that define a plurality a plurality of apertures 354 therebetween. The arm members 352 may be described as being radially extending from the axis 359 (which may coincide with the axis 2 when the fire bowl apparatus 350 is coupled to the remainder of an exemplary oven). The apertures 354 are configured to provide airflow into the inverted stepped conical region 358 of the fire bowl apparatus 350. Additionally, the fire bowl apparatus 350 includes a ring portion 356 extending around the conical region 358 and coupled to the arm members 352.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure. Further, any features, components, and/or properties of any of the embodiments described herein may be incorporated into any other embodiments described herein.

All patents, patent documents, and references cited herein are incorporated in their entirety as if each were incorporated separately.

What is claimed is:

1. An oven comprising:
   an upper portion;
   a lower portion configured to interface with the upper portion to define an enclosed volume, wherein the lower portion is further configured to receive a heat source to provide heat to the enclosed volume, wherein the enclosed volume comprises:
     a lower region defined by the lower portion, and
     an upper region defined by the upper portion;
   a cooking surface apparatus suspended within the enclosed volume and defining a cooking surface facing the upper region of the enclosed volume configured to receive cookable material thereon, wherein the cooking surface apparatus comprises a baking stone defining the cooking surface, wherein the baking stone is configured to provide the cooking surface of the cooking surface apparatus; and
   fire bowl apparatus located in the lower region of the enclosed volume and configured to hold combustible material away from an inner wall of the lower portion to allow airflow around and through the fire bowl apparatus, wherein the fire bowl apparatus defines an inverted stepped conical region configured to hold combustible material,
   wherein the upper portion defines an upper passage from outside of the oven into the upper region of the enclosed volume and comprises upper door apparatus configurable in at least an open position and a closed position, wherein, when in the open position, the upper door apparatus allows passage of material through the upper passage into the upper region of the enclosed volume from outside of the oven and, when in the closed position, the upper door apparatus prevents passage of material through the upper passage into the upper region of the enclosed volume,
   wherein the lower portion defines a lower passage from outside of the oven into the lower region of the enclosed volume and comprises lower door apparatus configurable in at least an open position and a closed position, wherein, when in the open position, the lower door apparatus allows passage of material through the lower passage into the lower region of the enclosed volume from outside of the oven and, when in the closed position, the lower door apparatus prevents passage of material through the lower passage into the lower region of the enclosed volume.

2. The oven of claim 1, wherein the fire bowl apparatus further comprises a plurality of radially-extending arm members that define a plurality apertures configured to allow airflow therethrough.

3. The oven of claim 1, wherein each of the upper portion and the lower portion defines one or more vent openings extending from the enclosed volume to outside of the oven, wherein the oven further comprises an upper vent apparatus coupled to the upper portion proximate to the one or more vent openings and a lower vent apparatus coupled to the lower portion proximate to the one or more vent openings, wherein each of the upper vent apparatus and the lower vent apparatus is configurable between an open position and a closed position, wherein, when in the open position, the vent apparatus allows passage of air between the enclosed volume and outside of the oven through the one or more vent openings and, when in the closed position, the vent apparatus restricts passage of air between the enclosed volume and outside of the oven through the one or more vent openings.

4. The oven of claim 1, wherein the lower portion defines one or more vent openings extending from the enclosed volume to outside of the oven, wherein the oven further comprises lower vent apparatus coupled to the lower portion proximate to the one or more vent openings and configured to selectively provide passage of air between the enclosed volume and outside of the oven through the one or more vent openings, wherein the one or more vent openings are configured to allow air to flow underneath combustible material located in the fire bowl apparatus from outside of the oven and to allow combusted material to pass from the fire bowl apparatus to outside of the oven.

5. The oven of claim 1, wherein the oven further comprises heat control apparatus defining a circular region and a ring region located outside of the circular region, wherein the ring region defines a plurality of apertures to allow passage of air in the enclosed volume between the lower region and the upper region.

* * * * *